US011978582B2

(12) United States Patent
Maesawa et al.

(10) Patent No.: US 11,978,582 B2
(45) Date of Patent: May 7, 2024

(54) COIL COMPONENT

(71) Applicant: SUMIDA CORPORATION, Tokyo (JP)

(72) Inventors: Sho Maesawa, Natori (JP); Takashi Haga, Natori (JP)

(73) Assignee: SUMIDA CORPORATION (JP)

( * ) Notice: Subject to any disclaimer, the term of this patent is extended or adjusted under 35 U.S.C. 154(b) by 654 days.

(21) Appl. No.: 17/155,147

(22) Filed: Jan. 22, 2021

(65) Prior Publication Data

US 2021/0265104 A1 Aug. 26, 2021

(30) Foreign Application Priority Data

Feb. 25, 2020 (JP) ................................ 2020-029261

(51) Int. Cl.

| | |
|---|---|
| ***H01F 27/32*** | (2006.01) |
| ***H01F 27/02*** | (2006.01) |
| ***H01F 27/30*** | (2006.01) |
| *H01F 27/24* | (2006.01) |

(52) U.S. Cl.

CPC ......... *H01F 27/325* (2013.01); *H01F 27/022* (2013.01); *H01F 27/306* (2013.01); *H01F 27/24* (2013.01)

(58) Field of Classification Search

CPC .... H01F 27/325; H01F 27/022; H01F 27/306; H01F 27/24; H01F 27/027; H01F 27/324; H01F 30/10

See application file for complete search history.

(56) References Cited

U.S. PATENT DOCUMENTS

| | | | | |
|---|---|---|---|---|
| 4,363,014 | A | 12/1982 | Leach et al. | |
| 2002/0057163 | A1* | 5/2002 | McGrane ................ | H01F 27/02 336/90 |
| 2013/0135073 | A1 | 5/2013 | Maeda | |
| 2015/0325354 | A1 | 11/2015 | Sasaki | |
| 2017/0309393 | A1 | 10/2017 | Jung et al. | |

FOREIGN PATENT DOCUMENTS

| | | | | |
|---|---|---|---|---|
| EP | 1197974 | A2 * | 4/2002 | ............. H01F 27/02 |
| GB | 2340667 | A | 2/2000 | |
| JP | S63-172113 | U | 11/1988 | |

(Continued)

OTHER PUBLICATIONS

European Search Report issued for corresponding European Application No. 21158727; dated Aug. 3, 2021 (total 11 pages).

(Continued)

*Primary Examiner* — Tuyen T Nguyen

(74) *Attorney, Agent, or Firm* — Harness, Dickey & Pierce, P.L.C.

(57) ABSTRACT

A coil component having a structure that can easily realize a desired positional relationship between a cover member and a bobbin portion is provided. The coil component includes a bobbin portion, a magnetic core inserted through the bobbin portion, and a coil wound around the bobbin portion, and a cover member covering the bobbin portion by being externally fitted to the bobbin portion. In the coil component, the cover member and the bobbin portion abut each other, and at least one of the cover member and the bobbin portion elastically biases the other in a first direction parallel to a mounting surface.

7 Claims, 9 Drawing Sheets

(56) References Cited

FOREIGN PATENT DOCUMENTS

| | | | |
|---|---|---|---|
| JP | H03-41971 | U | 4/1991 |
| JP | H03-53816 | U | 5/1991 |
| JP | H07-263238 | A | 10/1995 |
| JP | 2001-085249 | A | 3/2001 |
| JP | 2014236128 | A | 12/2014 |
| JP | 2017-212355 | A | 11/2017 |
| JP | 2018-067674 | A | 4/2018 |
| WO | 2016-071098 | A2 | 5/2016 |

OTHER PUBLICATIONS

Office Action issued in the corresponding Japanese Patent Application No. 2020-029261; dated Sep. 12, 2023 (total 6 pages).

* cited by examiner

COIL COMPONENT

CROSS-REFERENCE TO RELATED APPLICATIONS

This application claims the benefit of Japanese Patent Application No. 2020-029261 filed on Feb. 25, 2020 in the Japanese Patent Office, the disclosure of which is incorporated by reference herein in its entirety.

BACKGROUND

Field of the Invention

The present invention relates to a coil component.

Related Art

A coil component is disclosed in Japanese Laid-open patent publication NO. 2014-236128, for example.

The coil component in Japanese Laid-open patent publication NO. 2014-236128 includes a bobbin portion (described as a bobbin in the document), a coil wound around the bobbin portion, a magnetic core inserted through the bobbin portion, and a cover member (described as a case in the document) covering the bobbin portion.

According to the study by the inventors of the present application, the structure of the coil component in Japanese Laid-open patent publication NO. 2014-236128 has room for improvement from the viewpoint of realizing a desired positional relationship between the cover member and the bobbin portion.

The present invention has been made in view of the above issue and provides a coil component having a structure that can easily realize a desired positional relationship between a cover member and a bobbin portion.

SUMMARY

According to the present invention, there is provided a coil component comprising:

- a bobbin portion;
- a magnetic core inserted through the bobbin portion;
- a coil wound around the bobbin portion; and
- a cover member covering the bobbin portion by being externally fitted to the bobbin portion, wherein
- the cover member and the bobbin portion abut each other, and at least one of the cover member and the bobbin portion elastically biases the other in a first direction parallel to a mounting surface.

According to the present invention, it is possible to easily realize a desired positional relationship between the cover member and the bobbin portion.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 9A is a perspective view, FIG. 9B is a front view, and FIG. 9C is a plan view.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
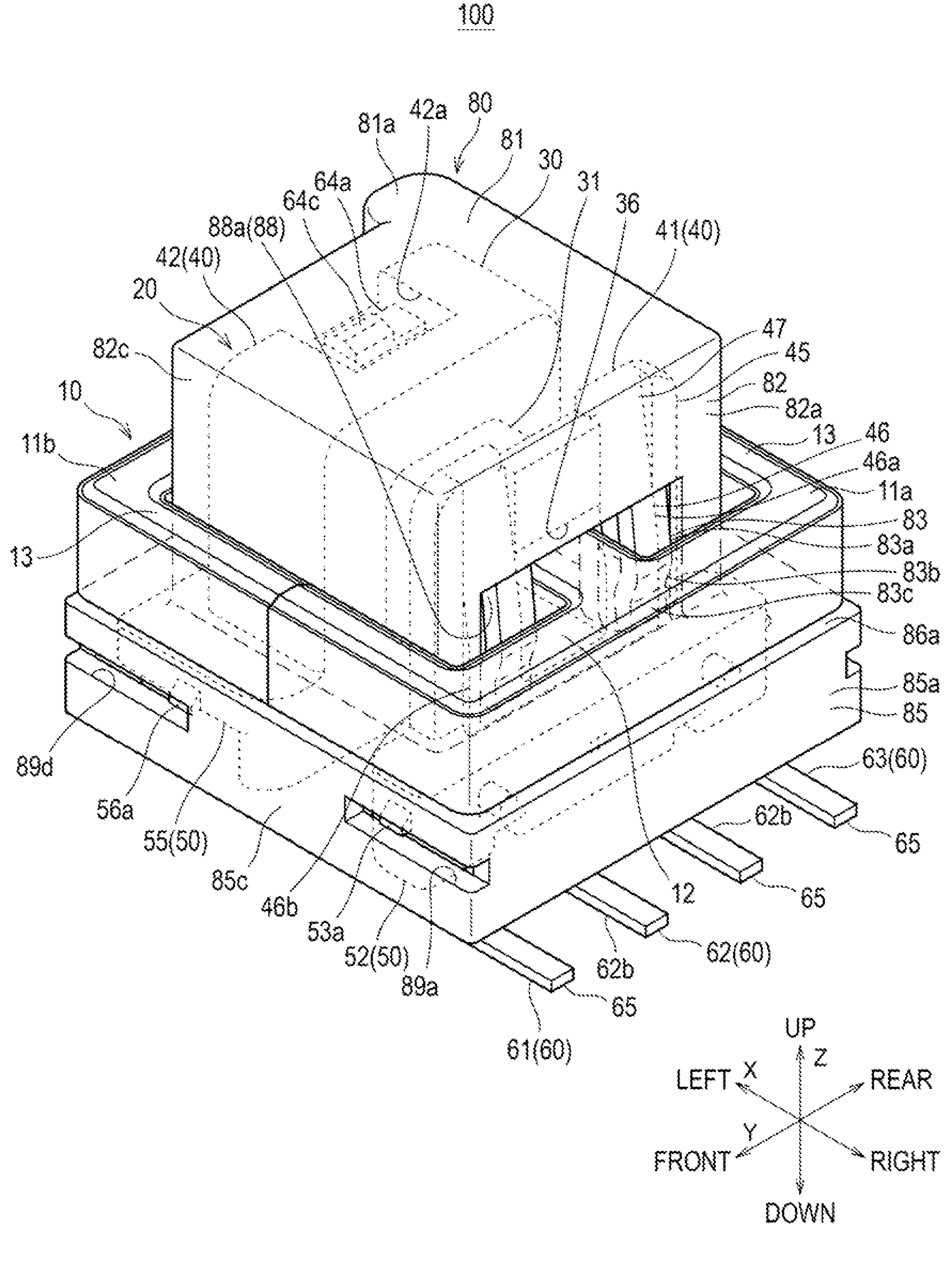
FIG. 1 is a perspective view of a coil component according to an embodiment.
Figure 2:
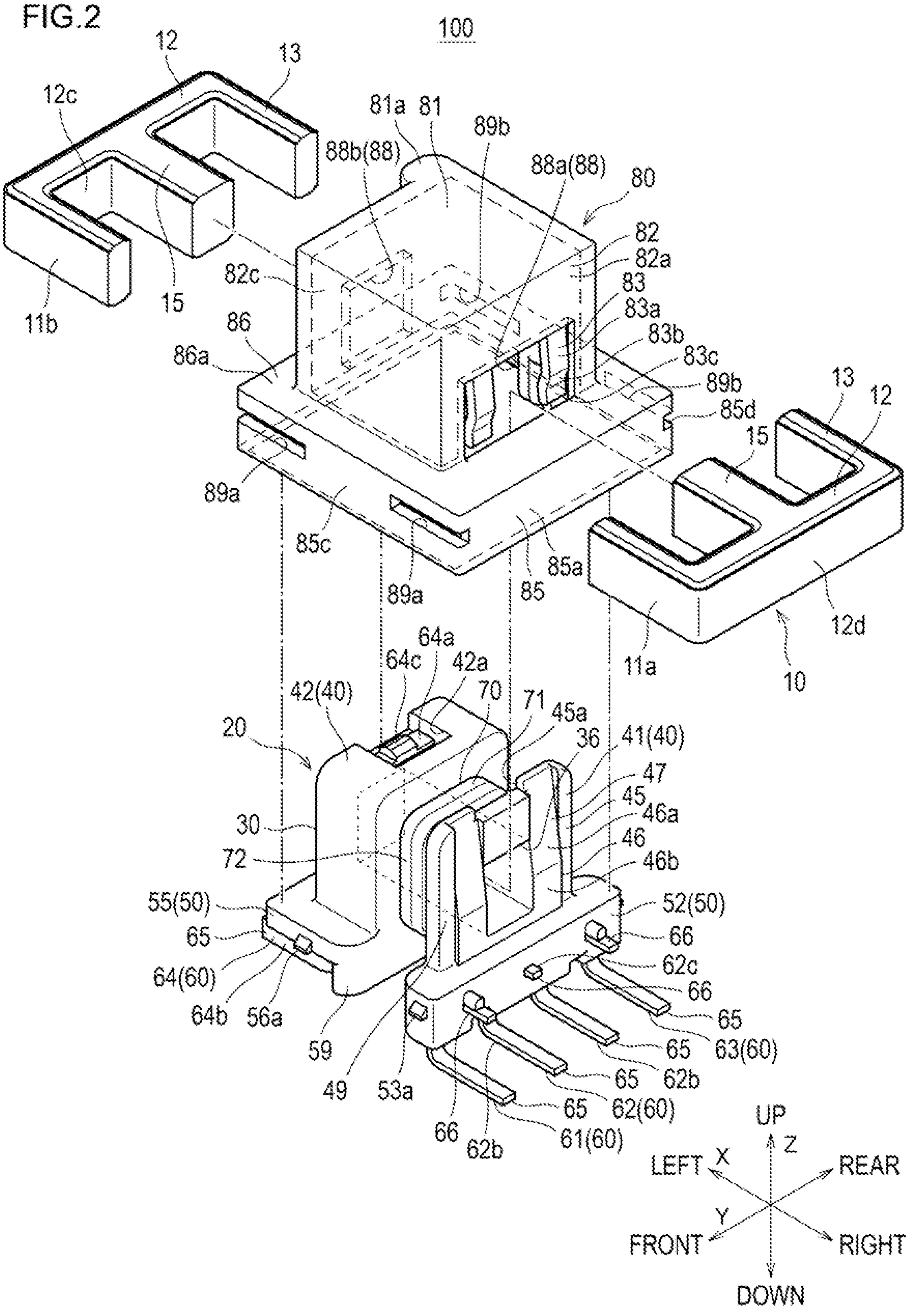
FIG. 2 is an exploded perspective view of the coil component according to the embodiment.
Figure 3:
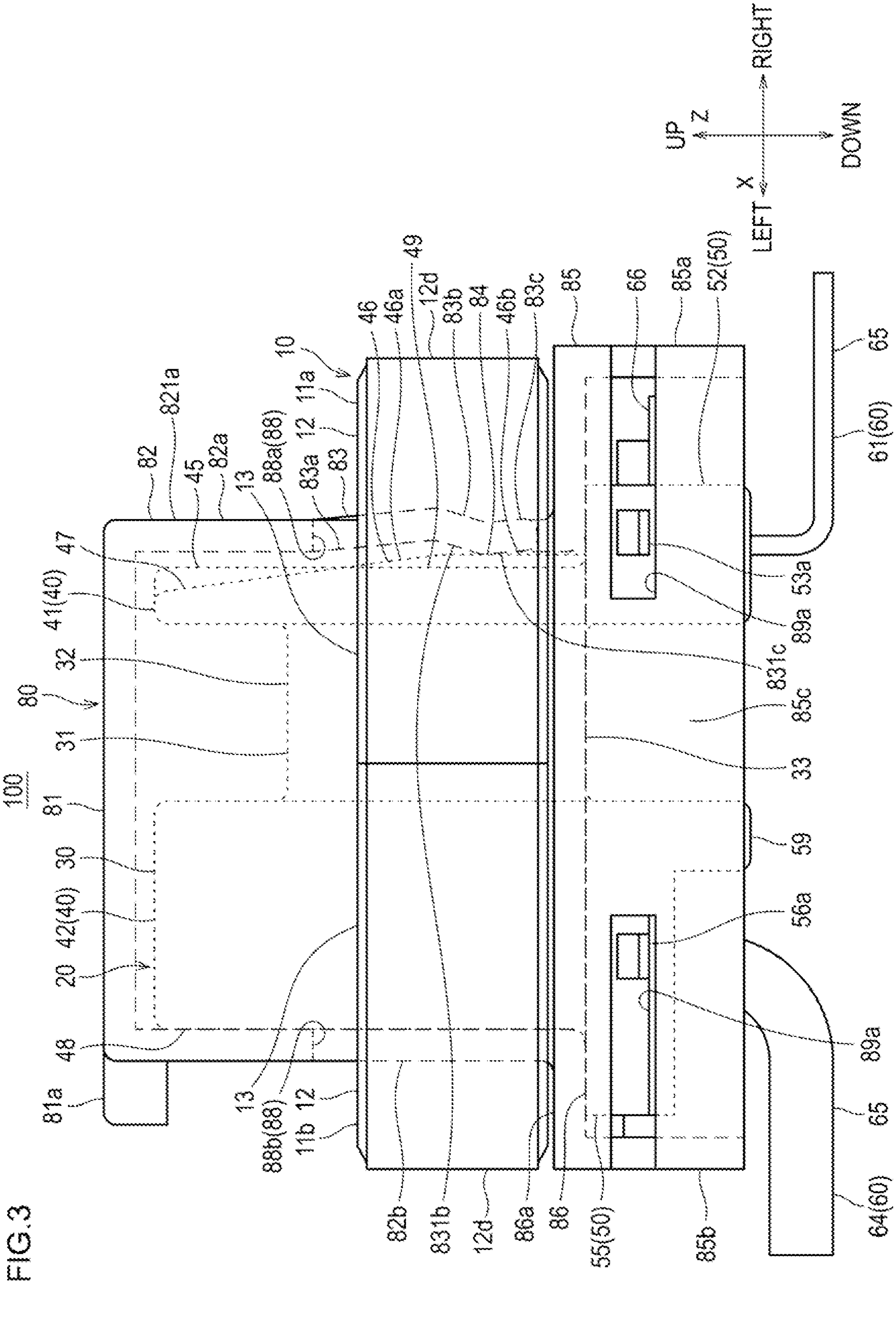
FIG. 3 is a front view of the coil component according to the embodiment.
Figure 4:
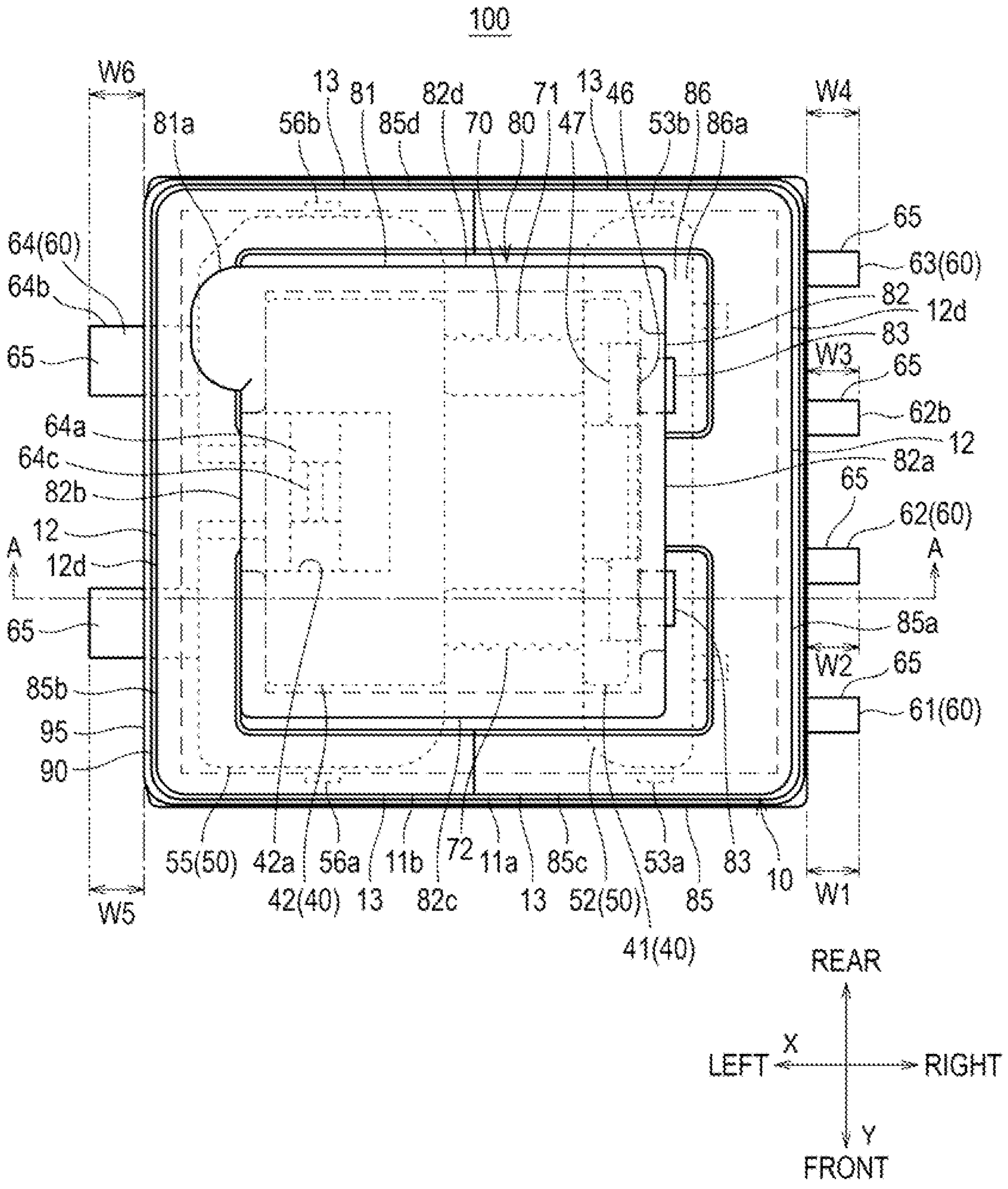
FIG. 4 is a plan view of the coil component according to the embodiment.
Figure 6:
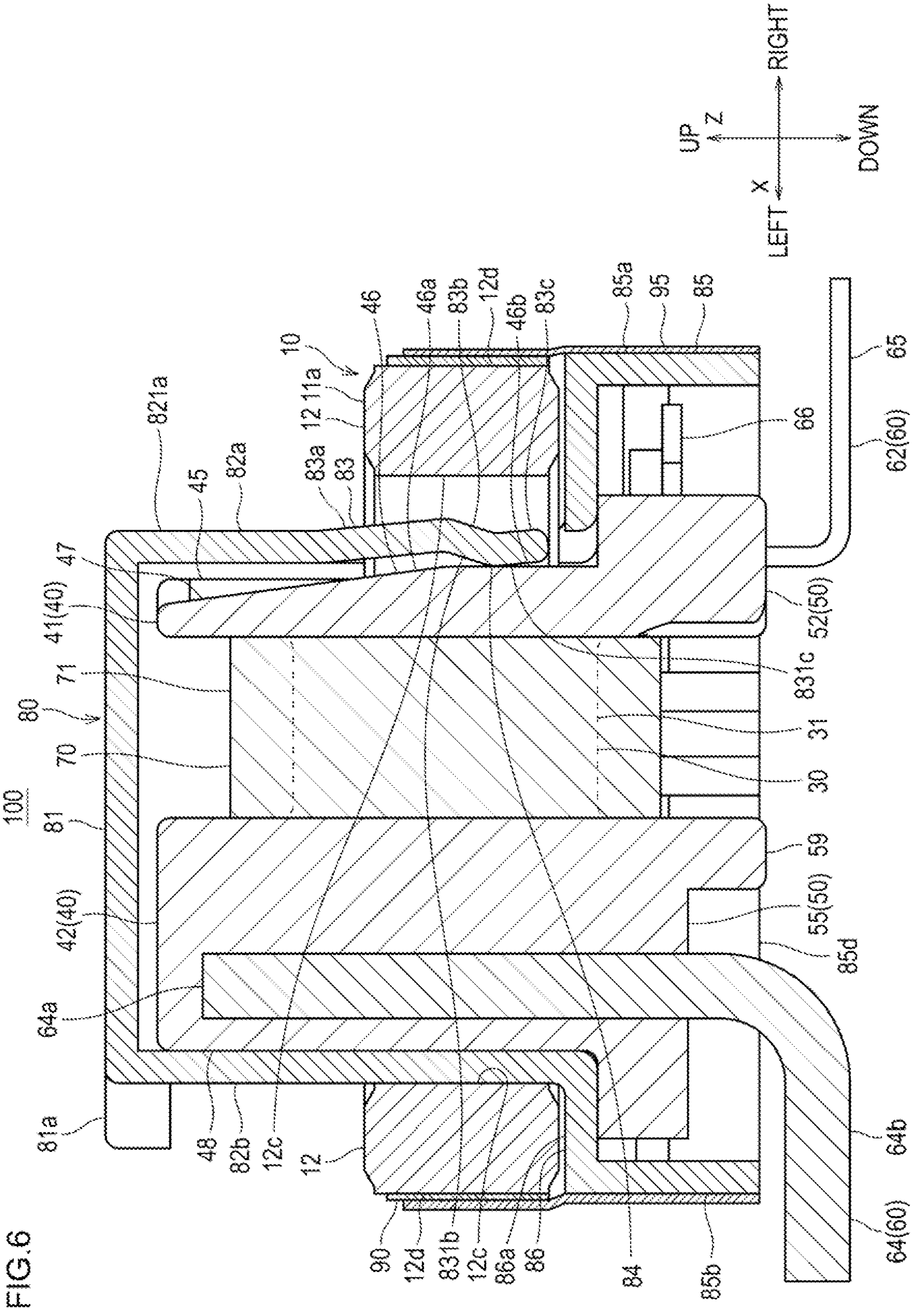
FIG. 6 is a cross-sectional view taken along line A-A in FIG. 4.
Figure 7:
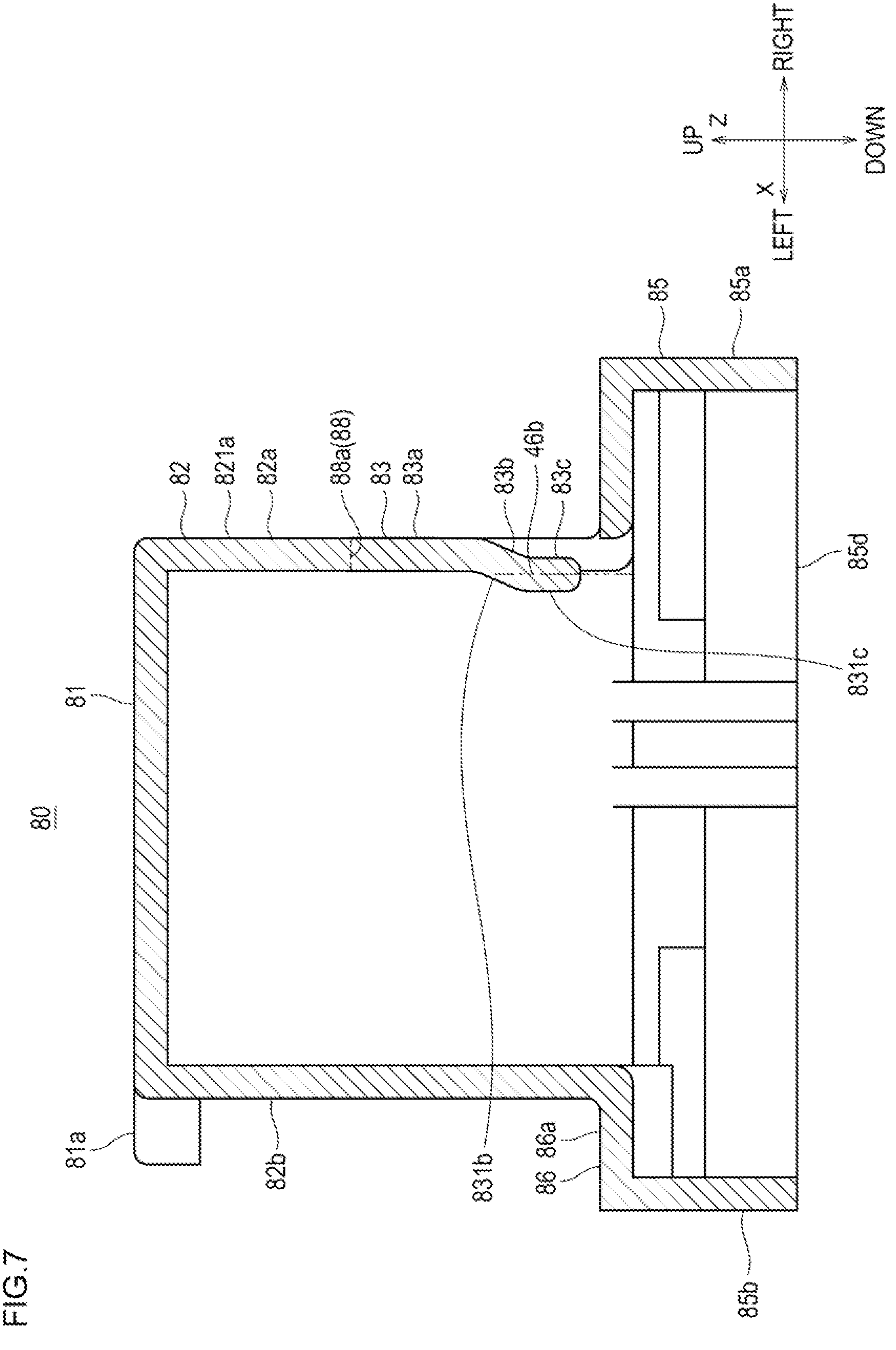
FIG. 7 illustrates a cover member according to the embodiment in a cross-sectional view taken along line A-A of FIG. 4.
Figure 8:
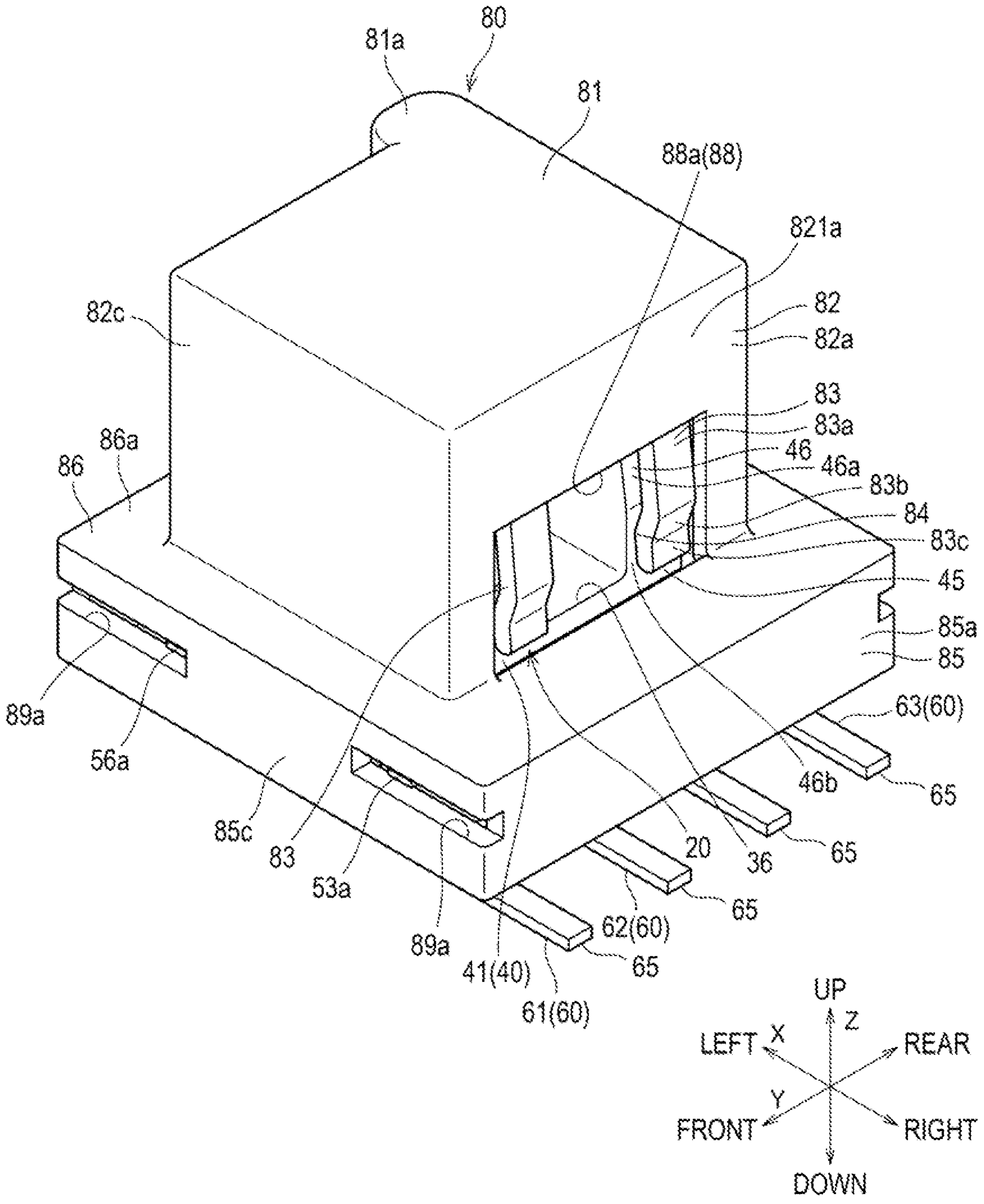
FIG. 8 is a perspective view of the cover member and a main body member according to the embodiment.

The following describes the embodiments of the present invention with reference to FIGS. 1 to 9C. Note that a first fixing tape 90 and a second fixing tape 95 are not shown in FIGS. 1 and 3. In FIGS. 1, 3, and 4, a main body member 20 is indicated by dotted lines. In FIG. 4, a coil 70 is also indicated by dotted lines. FIG. 8 illustrates a state in which a cover member 80 and a main body member 20 are assembled to each other.

Note that the same reference characters are given to the similar components in all the drawings, and the descriptions thereof will not be repeated.

As shown in any of FIGS. 1 to 9C, a coil component 100 according to this embodiment includes a bobbin portion 30, a magnetic core 10 inserted through the bobbin portion 30, a coil 70 wound around the bobbin portion 30, and a cover member 80 covering the bobbin portion 30 by being externally fitted to the bobbin portion 30.

In the coil component 100, the cover member 80 and the bobbin portion 30 abut each other, and at least one of the cover member 80 and the bobbin portion 30 elastically biases the other in a first direction parallel to a mounting surface. The phrase "the other" here refers to the one of the cover member 80 and the bobbin portion 30 that is elastically biased (a counterpart).

Here, to elastically bias means that at least one of the cover member 80 and the bobbin portion 30 elastically deforms and the one elastically biases the counterpart with its elastic restoring force.

In addition, to bias in the first direction means that, when the biasing force is vector-resolved into three directions: the first direction; a direction parallel to the mounting surface and orthogonal to the first direction; and a direction orthogonal to the mounting surface, the component of the first direction is the largest of these three directions.

According to this embodiment, at least one of the cover member 80 and the bobbin portion 30 elastically biases the other in the first direction. Therefore, even if there is a manufacturing variation in the dimension of one or both of the cover member 80 and the bobbin portion 30 in the first direction, the cover member 80 and the bobbin portion 30 can be positioned to each other in the first direction, so that the misalignment between the cover member 80 and the bobbin portion 30 in the first direction can be suppressed.

Moreover, at least one of the cover member 80 or the bobbin portion 30 can elastically deform in conformity with the manufacturing variation to absorb the manufacturing variation. Thus, it is possible to easily realize a desired positional relationship between the cover member 80 and the bobbin portion 30.

In the following description, the up-down direction will be referred to as a Z direction. The lower (down) side is the side on which terminal portions 60 (FIG. 1, etc.), which will be described later, are arranged, that is, the side toward a mounting surface onto which the coil component 100 is mounted. However, the positional relationships (in particular, the positional relationships in the up-down direction) between parts during manufacture and use of the coil component 100 are not limited to the positional relationships described herein.

The axial direction of the coil 70 extends in a direction orthogonal to the Z direction. The axial direction of the coil 70 is referred to as an X direction, one side in the X direction is referred to as a right (rightward) side, and the other is referred to as a left (leftward) side.

A direction orthogonal to both of the X direction and the Z direction is referred to as a Y direction, one side in the Y direction is referred to as a front (frontward) side, and the other is referred to as a rear (rearward) side.

These directions are indicated in each figure.

Further, in the X direction, the side on which the center position of the coil 70 in the axial direction of the coil 70 is located is referred to as an inward (inner) side, and the side opposite to the inward side is referred to as an outward (outer) side. Similarly, in the Y direction, the side on which the center position of the coil 70 in the front-rear direction is located is referred to as an inward (inner) side, and the side opposite to the inward side is referred to as an outward (outer) side.

An orientation (direction) orthogonal to the Z direction is referred to as horizontal (horizontal direction), and an orientation (direction) along the Z direction is referred to as vertical (vertical direction).

As shown in FIG. 2, in the case of this embodiment, the magnetic core 10 includes a pair of left and right core members, namely a first core member 11*a* arranged on the right side and a second core member 11*b* arranged on the left side, for example.

Each of the first core member 11*a* and the second core member 11*b* is what is called an E core and is formed to have an E-shaped planar shape (see FIG. 4), for example.

More specifically, the first core member 11*a* includes a base portion 12 extending in the front-rear direction, a pair of outer leg portions 13 protruding leftward from both end portions of the base portion 12, and a core portion 15 protruding leftward from an intermediate portion of the base portion 12. The direction in which the outer leg portions 13 and the core portion 15 protrude from the base portion 12 is the same as the axial direction of the coil 70.

The base portion 12 is formed in a prismatic shape that is long in the front-rear direction and has a rectangular cross section orthogonal to the axial direction, for example. Two of the four surfaces of the base portion 12 arranged around its axis are an upper surface and a lower surface that are horizontal, one of the remaining two surfaces (hereinafter, an inner side surface 12*c*) faces toward the bobbin portion 30, and the other (hereinafter, an outer side surface 12*d*) faces opposite the bobbin portion 30. In the case of this embodiment, the inner side surface 12*c* of the base portion 12 of the first core member 11*a* forms the inner side surface of the first core member 11*a*, and the outer side surface 12*d* of the base portion 12 forms the outer side surface of the first core member 11*a*.

Each outer leg portion 13 and the core portion 15 are formed in a prismatic shape that is long in the left-right direction and have a rectangular cross section orthogonal to the axial direction, for example. Two of the four surfaces of the outer leg portion 13 and the core portion 15 arranged around these axes are an upper surface and a lower surface that are horizontal, one of the remaining two surfaces faces frontward, and the other faces rearward.

The base portion 12, each outer leg portion 13, and the core portion 15 are set to have the same up-down dimension, for example. In the first core member 11*a*, the upper surface of the base portion 12, the upper surfaces of the outer leg portions 13, and the upper surface of the core portion 15 are arranged flush with each other. That is, the entire upper surface of the first core member 11*a* is formed flat and arranged horizontally. Similarly, in the first core member 11*a*, the lower surface of the base portion 12, the lower surfaces of the outer leg portions 13 and the lower surface of the core portion 15 are arranged flush with each other. That is, the entire lower surface of the first core member 11*a* is formed flat and arranged horizontally.

The second core member 11*b* is formed in the same shape as the first core member 11*a*, for example. That is, the second core member 11*b* includes a base portion 12, a pair of outer leg portions 13, and a core portion 15. The base portion 12 has an upper surface, a lower surface, an inner side surface 12*c*, and an outer side surface 12*d*.

The second core member 11*b* is arranged to have a left-right symmetry with the first core member 11*a*.

The end surface of each outer leg portion 13 of each of the first core member 11*a* and the second core member 11*b* in the protruding direction is formed flat and is a vertical surface orthogonal to the axial direction of the coil 70.

Similarly, the end surface of the core portion 15 of each of the first core member 11*a* and the second core member 11*b* in the protruding direction is formed flat and is a vertical surface orthogonal to the axial direction of the coil 70.

As shown in FIG. 4, the inner side surface 12*c* and the outer side surface 12*d* of the base portion 12 are also formed flat and are vertical surfaces orthogonal to the axial direction of the coil 70. The inner side surface of the first core member 11*a* and the inner side surface of the second core member 11*b* face each other, and the outer side surface of the first core member 11*a* and the outer side surface of the second core member 11*b* face opposite to each other.

As shown in FIG. 2, the coil component 100 further includes a main body member 20 including the bobbin portion 30 and terminal holding portions 50, and a plurality of terminal portions 60 held by the terminal holding portions 50. A winding wire 71 forming the coil 70 is wound around the bobbin portion 30.

The bobbin portion 30 includes a tubular portion 31 and a pair of collar portions 40 provided at both end portions of the tubular portion 31 in the axial direction, for example.

The tubular portion 31 is formed in a rectangular tubular shape having a through hole 36 penetrating therethrough in the axial direction. The axial direction of the tubular portion 31 (the axial direction of the through hole 36) is the left-right direction, which coincides with the axial direction of the coil 70.

Figure 9A:
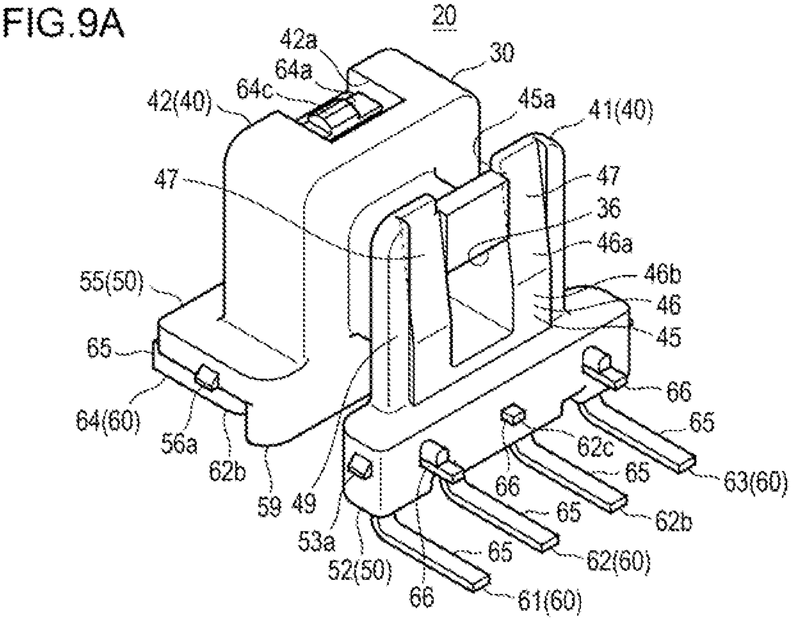
FIGS. 9A, 9B, and 9C illustrate the main body member according to the embodiment, where
Figure 9B:
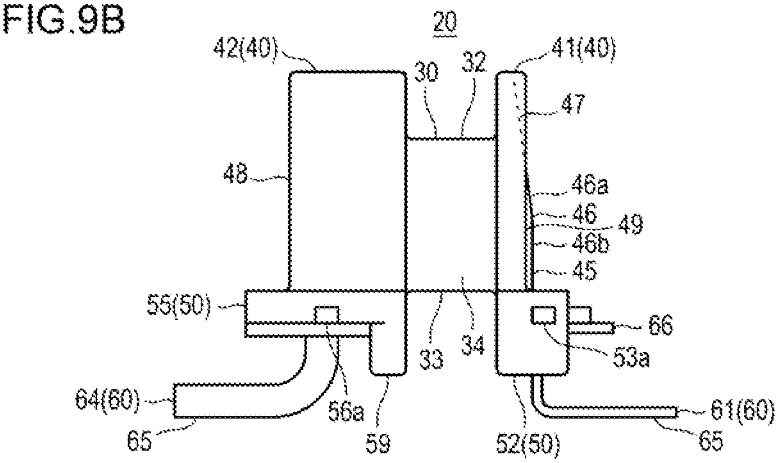
Figure 9C:
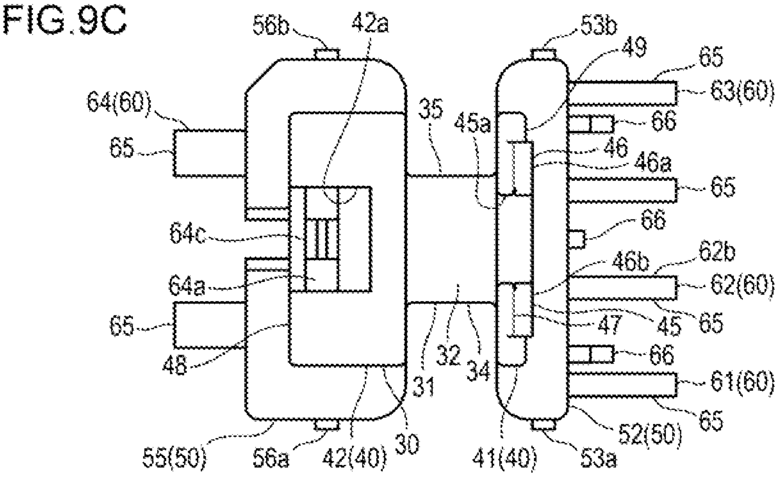

As shown in FIGS. 9B and 9C, the tubular portion 31 includes an upper wall portion 32 and a lower wall portion 33 that are arranged horizontally, and a front wall portion 34 and a rear wall portion 35 that are arranged vertically, for example.

For example, the internal space of the through hole 36 has a prismatic shape. The bottom surface (inner peripheral bottom surface) and the top surface of the inner peripheral surface of the through hole 36 are horizontal surfaces, and the front and rear surfaces of the inner peripheral surface of the through hole 36 are vertical surfaces.

As shown in FIGS. 9A, 9B, and 9C, the bobbin portion 30 includes a pair of collar portions 40, namely a first collar portion 41 arranged on the right side and a second collar portion 42 arranged on the left side, for example.

Each of the first collar portion 41 and the second collar portion 42 juts out from both end portions of the tubular portion 31 toward the external surrounding space of the tubular portion 31, for example.

More specifically, the first collar portion 41 is formed in a flat plate shape orthogonal to the axial direction of the tubular portion 31, for example. The second collar portion 42 is formed in a flat rectangular parallelepiped shape of which the left-right dimension is smaller than each of the up-down dimension and the front-rear dimension, and each of the right-side and left-side surfaces is orthogonal to the first direction, for example.

The left-right dimension (thickness dimension) of the first collar portion 41 is smaller than the left-right dimension (thickness dimension) of the second collar portion 42. The front-rear dimension of the first collar portion 41 is equal to the front-rear dimension of the second collar portion 42, and the up-down dimension of the first collar portion 41 is equal to the up-down dimension of the second collar portion 42.

Further, the front end surface of the first collar portion 41 and the front surface of the second collar portion 42 are arranged flush with each other, and the rear end surface of the first collar portion 41 and the rear surface of the second collar portion 42 are arranged flush with each other.

A concave portion 42*a* is formed at a central portion of the upper surface of the second collar portion 42 in the front-rear direction, for example. The concave portion 42*a* is recessed downward and opens leftward.

As shown in FIGS. 9A, 9B, and 9C, the main body member 20 includes, as the terminal holding portions 50, a first terminal holding portion 52 arranged on the right side and a second terminal holding portion 55 arranged on the left side.

The first terminal holding portion 52 is formed in a flat prismatic shape that is long in the front-rear direction and of which the left-right dimension is smaller than the up-down dimension, for example.

The second terminal holding portion 55 is formed in a flat plate shape that is long in the front-rear direction and of which the up-down dimension is smaller than the left-right dimension, for example.

On the lower surface of the second terminal holding portion 55, a jutting portion 59 (see FIGS. 2 and 3) hung from the right edge portion of the second terminal holding portion 55 is formed, for example. The jutting portion 59 is formed in a flat plate shape whose plate surface faces in the left-right direction. The right side surface of the jutting portion 59 is arranged flush with the right side surface of the second terminal holding portion 55.

The first terminal holding portion 52 juts out from the lower edge of the first collar portion 41 in the rightward and front-rear directions. The second terminal holding portion 55 juts out from the lower edge of the second collar portion 42 in the leftward and front-rear directions.

In the case of this embodiment, the left-right dimension of the first terminal holding portion 52 is smaller than the left-right dimension of the second terminal holding portion 55. The up-down dimension of the first terminal holding portion 52 is larger than the up-down dimension of the second terminal holding portion 55 (the portion excluding the jutting portion 59). The front-rear dimension of the first terminal holding portion 52 is equal to the front-rear dimension of the second terminal holding portion 55. The height position of the lower end surface of the jutting portion 59 is equal to the height position of the lower end surface of the first terminal holding portion 52.

However, the dimensional relationship between the first terminal holding portion 52 and the second terminal holding portion 55 is not particularly limited, and the first terminal holding portion 52 and the second terminal holding portion 55 may have the same size.

The upper surfaces of the first terminal holding portion 52 and the second terminal holding portion 55 are formed flat and arranged horizontally.

The first terminal holding portion 52 holds a first terminal portion 61, a second terminal portion 62, and a third terminal portion 63, which will be described later, for example. The second terminal holding portion 55 holds a fourth terminal portion 64, which will be described later, for example.

Figure 5:
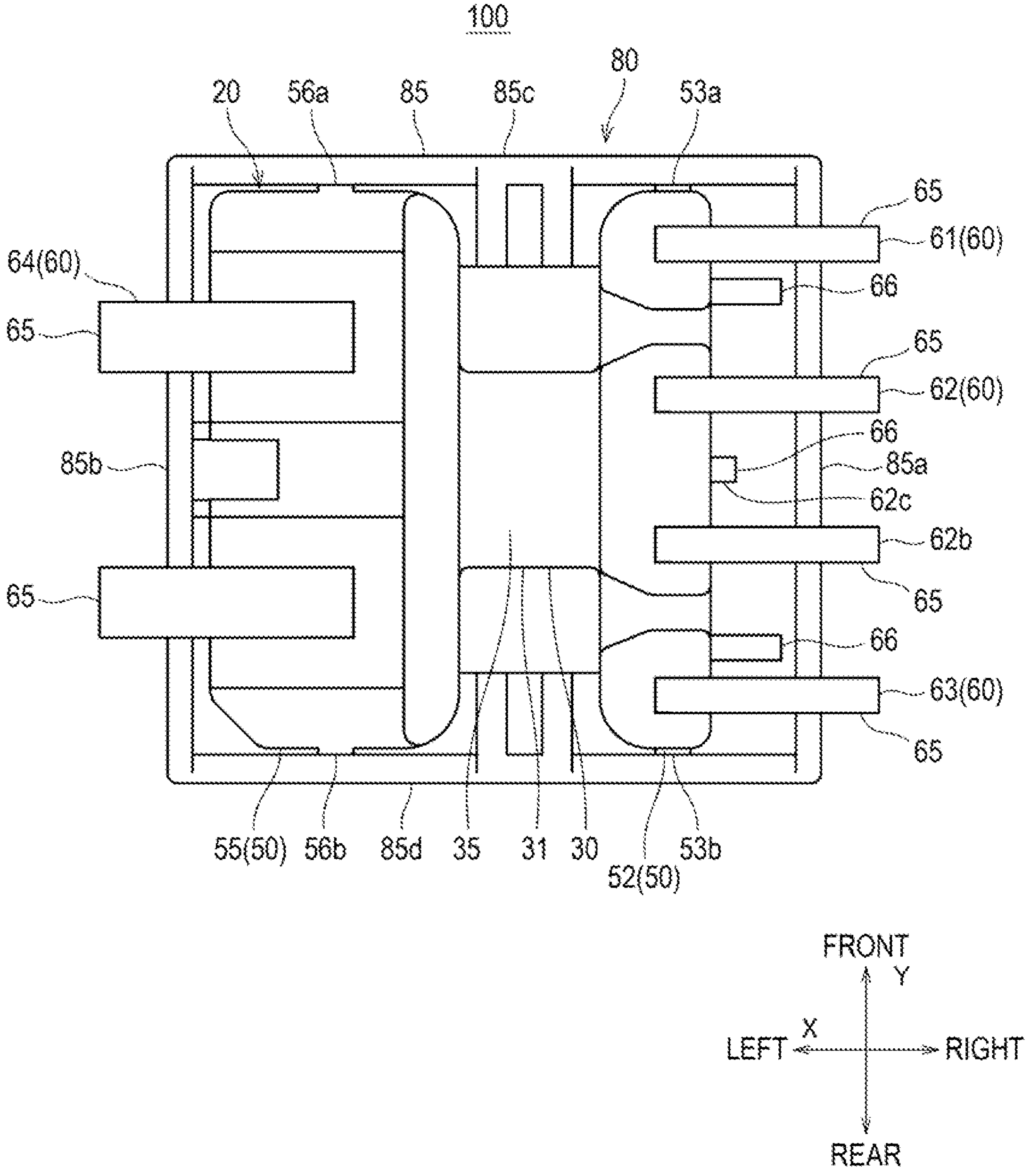
FIG. 5 is a bottom view of the coil component according to the embodiment.

As shown in FIGS. 4 and 5, in the case of this embodiment, the coil component 100 includes, as the terminal portions 60, the first terminal portion 61, the second terminal portion 62, the third terminal portion 63, and the fourth terminal portion 64, for example.

At the first terminal holding portion 52, the first terminal portion 61 to the third terminal portion 63 are arranged side by side in the front-rear direction in the order of the first terminal portion 61, the second terminal portion 62, and the third terminal portion 63 from the front side. The fourth terminal portion 64 is arranged at the second terminal holding portion 55.

The first terminal portion 61 is formed by bending a long plate-shaped metal material, for example.

As shown in FIGS. 2 and 3, the first terminal portion 61 has two end portions exposed to the outside from the first terminal holding portion 52 and an intermediate portion (not shown in the drawings) embedded in the first terminal holding portion 52. The one of the two exposed end portions that is arranged on the upper side is an entwining terminal 66 around which an end portion of the corresponding winding wire 71 is entwined, and the end portion arranged on the lower side is an external terminal 65 that is externally connected when the coil component 100 is mounted.

More specifically, the first terminal portion 61 is folded back inside the first terminal holding portion 52, and in front view, the first terminal portion 61 has a horizontally laid U-shape.

The entwining terminal 66 of the first terminal portion 61 extends horizontally and rightward from the right side surface of the first terminal holding portion 52. The external terminal 65 of the first terminal portion 61 protrudes downward from the bottom surface of the first terminal holding portion 52 and extends rightward.

For example, the third terminal portion 63 is formed in a same shape with the first terminal portion 61. Therefore, the third terminal portion 63 has an external terminal 65 and an entwining terminal 66 exposed to the outside from the first terminal holding portion 52 and an intermediate portion (not shown in the drawings) embedded in the first terminal holding portion 52.

The second terminal portion 62 is formed by bending a metal material having a plate shape that is long and is forked in the downward direction, for example.

As shown in FIGS. 2 and 6, the second terminal portion 62 has a pair of front and rear leg portions 62*b* exposed to the outside from the bottom surface of the first terminal holding portion 52, an extending portion 62*c* exposed to the outside from the right side surface of the first terminal holding portion 52, and a connecting portion (not shown in the drawings) embedded in the first terminal holding portion 52 and connecting the pair of leg portions 62*b* and the extending portion 62*c*.

The pair of leg portions 62*b* is external terminals 65 that are externally connected when the coil component 100 is mounted, and the extending portion 62*c* is an entwining terminal 66 around which an end portion of the corresponding winding wire 71 is entwined.

The second terminal portion 62 is folded back inside the first terminal holding portion 52, and in front view and plan view, the second terminal portion 62 has an up-down inverted U-shape that opens downward.

The entwining terminal 66 of the second terminal portion 62 extends horizontally and rightward from the right side surface of the first terminal holding portion 52. Each external terminal 65 of the second terminal portion 62 protrudes downward from the bottom surface of the first terminal holding portion 52 and extends rightward.

The left-right length dimensions of the external terminals 65 of the first terminal portion 61 to the third terminal portion 63 are set to be equal to each other, for example.

Also, the thickness dimensions of the plate-shaped metal materials forming the first terminal portion 61 to the third terminal portion 63 are set to be equal to each other.

The fourth terminal portion 64 is formed by bending a metal material having a plate shape that is long and is forked in the downward direction, for example.

As shown in FIGS. 3 and 6, the fourth terminal portion 64 has a pair of front and rear leg portions 64*b* exposed to the outside from the bottom surface of the second terminal holding portion 55 and a connecting portion 64*a* embedded in the second terminal holding portion 55 and the second collar portion 42 and connecting the pair of leg portions 64*b*.

The pair of leg portions 64*b* is external terminals 65 that are externally connected when the coil component 100 is mounted.

The fourth terminal portion 64 is folded back inside the second terminal holding portion 55 and the second collar portion 42, and in side view and plan view, the fourth terminal portion 64 has an up-down inverted U-shape that opens downward.

As shown in FIGS. 9A and 9C, the central portion of the upper surface of the connecting portion 64*a* in the front-rear direction is exposed to the outside from the bottom surface of the concave portion 42*a* of the second collar portion 42, and in the exposed portion, the connecting portion 64*a* has a protruding portion 64*c* protruding upward, for example.

Each external terminal 65 protrudes downward from the bottom surface of the second terminal holding portion 55 and extends leftward, for example.

The left-right length dimensions of the external terminals 65 of the fourth terminal portion 64 are set to be equal to each other, for example.

The thickness dimension of the plate-shaped metal material forming the fourth terminal portion 64 is larger than the thickness dimension of the plate-shaped metal materials forming the first terminal portion 61 to the third terminal portion 63, for example.

The coil component 100 includes a first coil and a second coil as the coil 70, for example.

The first coil and the second coil are formed by respective winding wires 71. Each winding wire 71 of the coil 70 is wound around the tubular portion 31 of the bobbin portion 30. A winding portion 72 (see FIG. 2) is formed by the winding wire 71 wound around the tubular portion 31. Both end portions of each winding wire 71 are each electrically connected to the corresponding terminal portion 60.

Note that the end portions of the winding wires 71 entwined around the entwining terminals 66 and the portions extending from the winding portion 72 toward the terminal portions 60 are not shown in the drawings.

As shown in FIGS. 2, 4, 6 and 8, the cover member 80 has a side peripheral wall portion 82 (a first side peripheral wall portion 82) having a rectangular prismatic tubular shape and including a first wall portion 82*a*, a second wall portion 82*b*, a third wall portion 82*c*, and a fourth wall portion 82*d*, for example.

The cover member 80 also has a top surface portion 81 (see FIG. 2, etc.) closing the upper end of the side peripheral wall portion 82. Further, as shown in FIGS. 2, 6 and 7, the cover member 80 opens downward, for example.

The first wall portion 82*a* to the fourth wall portion 82*d* are each formed in a flat plate shape and arranged vertically.

As shown in FIGS. 4 and 6, the first wall portion 82*a* and the second wall portion 82*b* face each other, and the third wall portion 82*c* and the fourth wall portion 82*d* face each other, for example. More specifically, the plate surfaces (wall surfaces) of the first wall portion 82*a* and the second wall portion 82*b* face in the left-right direction, for example. The plate surfaces (wall surfaces) of the third wall portion 82*c* and the fourth wall portion 82*d* face in the front-rear direction, for example.

The top surface portion 81 is formed in a flat plate shape and arranged horizontally, for example. Since the cover member 80 has the top surface portion 81, the top surface portion 81 can be adsorbed by a mounter in mounting the coil component 100 on a board, and the work of mounting the coil component 100 on the board can be easily performed.

Note that the top surface portion 81 may not be formed flat. The cover member 80 may also have a shape that does not have the top surface portion 81 (for example, a shape that opens upward and downward).

The cover member 80 has a protruding portion 81*a* (see FIGS. 1 and 3) protruding leftward from a rear portion of the left side surface of the top surface portion 81, for example. By virtue of the protruding portion 81*a*, the orientation of the cover member 80 can be easily recognized.

As described above, the cover member 80 is arranged to cover the bobbin portion 30, for example. More specifically, as shown in FIG. 4, the first wall portion 82*a* covers the right side of the bobbin portion 30, the second wall portion 82*b* covers the left side of the bobbin portion 30, the third wall portion 82*c* covers the front side of the bobbin portion 30, and the fourth wall portion 82*d* covers the rear side of the bobbin portion 30, for example. As shown in FIG. 3, the top surface portion 81 covers the upper side of the bobbin portion 30.

Since the cover member 80 covers the bobbin portion 30 in this manner, it is possible to obtain a sufficient voltage withstanding property of the coil component 100.

As shown in FIGS. 2 and 3, a through opening 88*a* penetrating the first wall portion 82*a* in the left-right direction is formed in the first wall portion 82*a*, for example. Similarly, a through opening 88*b* penetrating the second wall portion 82*b* in the left-right direction is formed in the second wall portion 82*b*, for example. The through opening 88*a* and the through opening 88*b* are arranged to face each other.

The through opening 88*b* of the second wall portion 82*b* is formed in a rectangular shape that is substantially equal to the shape of the through hole 36 of the bobbin portion 30 as viewed in the axial direction, for example. On the other hand, the through opening 88*a* of the first wall portion 82*a* is formed in a substantially rectangular shape that is long in the front-rear direction (see FIG. 8), for example. The upper edge and the lower edge of the through opening 88*a* are arranged horizontally. Similarly, the upper edge and the lower edge of the through opening 88*b* are arranged horizontally.

In the case of this embodiment, the direction in which the first wall portion 82*a* and the second wall portion 82*b* face each other is the first direction, as an example. As described above, in the case of this embodiment, the direction in which the first wall portion 82*a* and the second wall portion 82*b* face each other is the left-right direction. Therefore, the first direction coincides with the axial direction of the coil 70 and the extending direction of the tip portion of each external terminal 65 (see FIG. 4).

Here, a direction parallel to the mounting surface and orthogonal to the first direction is referred to as a second direction. In the case of this embodiment, the direction in which the third wall portion 82*c* and the fourth wall portion 82*d* face each other is the second direction orthogonal to the first direction, as an example. As described above, in the case of this embodiment, the direction in which the third wall portion 82*c* and the fourth wall portion 82*d* face each other is the front-rear direction. Therefore, the second direction is a direction orthogonal to the axial direction of the coil 70 and the extending direction of the tip portion of each external terminal 65 (see FIG. 4).

However, in the present invention, the first direction and the second direction are not limited to the above-described example, and can be appropriately set according to the structure of each member forming the coil component 100, the positional relationship between the members to be realized, and the like.

As shown in FIG. 6, the cover member 80 further has a flange portion 86 jutting out from the lower end of the side peripheral wall portion 82 to the surrounding space (in the horizontal direction) and a second side peripheral wall portion 85 hung from the peripheral edge of the flange portion 86 and surrounding the terminal holding portions 50.

The flange portion 86 is formed in a flat plate shape and arranged horizontally, for example. An upper surface 86*a* and a lower surface of the flange portion 86 are horizontal surfaces formed substantially flat. However, a protruding portion protruding downward may be formed on the lower surface of the flange portion 86, for example.

As shown in FIG. 4, the second side peripheral wall portion 85 is formed in a rectangular shape in plan view, and the internal space of the second side peripheral wall portion 85 is formed in a rectangular parallelepiped shape, for example. The lower end of the second side peripheral wall portion 85 opens downward. In the case of this embodiment, the lower end-side opening of the second side peripheral wall portion 85 forms the opening of the cover member 80.

The second side peripheral wall portion 85 has a first wall portion 85*a* surrounding the right side of the terminal holding portion 50, a second wall portion 85*b* surrounding the left side of the terminal holding portion 50, a third wall portion 85*c* surrounding the front side of the terminal holding portion 50, and a fourth wall portion 85*d* surrounding the rear side of the terminal holding portion 50 (see FIGS. 4 and 5).

Each of the first wall portion 85*a* to the fourth wall portion 85*d* is formed in a flat plate shape and arranged vertically, for example.

As shown in FIG. 4, the plate surfaces (wall surfaces) of the first wall portion 85*a* and the second wall portion 85*b* face in the left-right direction. The plate surfaces (wall surfaces) of the third wall portion 85*c* and the fourth wall portion 85*d* face in the front-rear direction.

As shown in FIG. 6, in the flange portion 86, the left-right dimension of the portion jutting out rightward is larger than the left-right dimension of the portion jutting out leftward. More specifically, in the flange portion 86, the left-right dimension of the portion jutting out rightward is larger than the left-right dimension of the base portion 12 of the first core member 11*a*, and the left-right dimension of the portion jutting out leftward is set to be substantially equal to or slightly larger than the left-right dimension of the base portion 12 of the first core member 11*a*.

As described above, the cover member 80 opens downward, for example. The cover member 80 is externally fitted to the bobbin portion 30 by putting the cover member 80 over the bobbin portion 30 from above and pushing the cover member 80 downward against the main body member 20. Therefore, in the case of this embodiment, the direction in which the cover member 80 is externally fitted to the bobbin portion 30 (which may be hereinafter simply referred to as an externally-fitting direction) is the up-down direction.

In addition, the through openings 88*a* and 88*b* of the cover member 80 and the through hole 36 of the bobbin portion 30 are arranged coaxially with each other.

As shown in FIGS. 4 and 5, it is preferable that the inner surface of the first wall portion 82*a* is arranged to face the right side surface of the first collar portion 41 in parallel. It is preferable that the inner surface of the second wall portion 82*b* is arranged to face the left side surface of the second collar portion 42 in parallel. It is preferable that the inner surface of the third wall portion 82*c* is arranged to face the front end surface of the first collar portion 41 and the front surface of the second collar portion 42 in parallel. It is preferable that the inner surface of the fourth wall portion 82*d* is arranged to face the rear end surface of the first collar portion 41 and the rear surface of the second collar portion 42 in parallel.

As shown in FIG. 6, the inner surface (lower surface) of the top surface portion 81 and each of the upper end surface of the first collar portion 41 and the upper end surface of the second collar portion 42 are close to and face each other, for example. The inner surface of the top surface portion 81 and each of the upper end surface of the first collar portion 41 and the upper end surface of the second collar portion 42 may also be in surface contact with each other.

As shown in FIGS. 4 and 6, it is preferable that the inner surface of the first wall portion 85*a* is arranged to face the right side surface of the first terminal holding portion 52 in parallel. It is preferable that the inner surface of the second wall portion 85*b* is arranged to face the left side surface of the second terminal holding portion 55 in parallel. It is preferable that the inner surface of the third wall portion 85*c* is arranged to face each of the front surface of the first terminal holding portion 52 and the front surface of the second terminal holding portion 55 in parallel. It is preferable that the inner surface of the fourth wall portion 85*d* is arranged to face each of the rear surface of the first terminal holding portion 52 and the rear surface of the second terminal holding portion 55 in parallel.

As shown in FIG. 6, it is preferable that the lower surface of the portion of the flange portion 86 of the cover member 80 jutting out rightward from the first wall portion 82*a* is in surface contact with the upper surface of the first terminal holding portion 52, for example. It is preferable that the lower surface of the portion of the flange portion 86 jutting out leftward from the second wall portion 82*b* is in surface contact with the upper surface of the second terminal holding portion 55, for example.

The core portion 15 of the first core member 11*a* is inserted into the through hole 36 of the bobbin portion 30 via the through opening 88*a* of the first wall portion 82*a* (the right side of the cover member 80) (see FIG. 1). Similarly, the core portion 15 of the second core member 11*b* is inserted into the through hole 36 of the bobbin portion 30 via the through opening 88*b* of the second wall portion 82*b* (the left side of the cover member 80).

The end surface of the core portion 15 of the first core member 11*a* and the end surface of the core portion 15 of the second core member 11*b* abut against each other or are close to each other inside the through hole 36. That is, the end surface of the core portion 15 of the first core member 11*a* and the end surface of the core portion 15 of the second core member 11*b* may be in surface contact with each other, or may be close to and face each other.

A closed magnetic circuit is formed by the first core member 11*a* and the second core member 11*b*.

As shown in FIG. 4, since the coil 70 is wound around the bobbin portion 30 and the core portion 15 is inserted through the bobbin portion 30, the coil 70 is wound around the magnetic core 10.

As shown in FIG. 4, the front and rear outer leg portions 13 of the first core member 11*a* are arranged outside the side peripheral wall portion 82, and are provided along the outer surfaces of the third wall portion 82*c* and the fourth wall portion 82*d*, respectively. The base portion 12 of the first core member 11*a* is arranged outside the side peripheral wall portion 82, and the inner side surface 12*c* of the base portion 12 is arranged to face the outer surface of the first wall portion 82*a*.

Similarly, the front and rear outer leg portions 13 of the second core member 11*b* are arranged outside the side peripheral wall portion 82, and are provided along the outer surfaces of the third wall portion 82*c* and the fourth wall portion 82*d*, respectively. The base portion 12 of the second core member 11*b* is arranged outside the side peripheral wall portion 82, and the inner side surface 12*c* of the base portion 12 is arranged to face or be in surface contact with the outer surface of the second wall portion 82*b*.

More specifically, as shown in FIG. 4, a gap is formed between the inner side surface 12*c* of the base portion 12 of the first core member 11*a* and the outer surface of the first wall portion 82*a*. On the other hand, a gap may or may not be formed between the inner side surface 12*c* of the base portion 12 of the second core member 11*b* and the outer surface of the second wall portion 82*b*.

The end surface of the front-side outer leg portion 13 of the first core member 11*a* and the end surface of the front-side outer leg portion 13 of the second core member 11*b* abut against each other or are close to each other. That is, the end surface of the front-side outer leg portion 13 of the first core member 11*a* and the end surface of the front-side outer leg portion 13 of the second core member 11*b* may be in surface contact with each other, or may be close to and face each other. Similarly, the end surface of the rear-side outer leg portion 13 of the first core member 11*a* and the end surface of the rear-side outer leg portion 13 of the second core member 11*b* abut against each other or are close to each other.

The base portions 12 and the outer leg portions 13 of the first core member 11*a* and the second core member 11*b* are arranged above the flange portion 86 and are arranged along the upper surface 86*a* of the flange portion 86 (see FIGS. 3 and 6).

The lower surfaces of the core portions 15 are arranged along the inner peripheral bottom surface of the through hole 36.

As shown in FIG. 3, the lower surfaces of the first core member 11*a* and the second core member 11*b* are arranged on the same plane. The lower surfaces of the first core member 11*a* and the second core member 11*b* are arranged along the upper surface 86*a* of the flange portion 86. The lower surface of each of the first core member 11*a* and the second core member 11*b* and the upper surface 86*a* of the flange portion 86 may be in surface contact with each other, or may be close to and face each other.

As shown in FIGS. 4 and 6, it is preferable that the outer side surface 12*d* of the base portion 12 of the first core member 11*a* is arranged inside or flush with the outer surface of the first wall portion 85*a* of the second side peripheral wall portion 85. It is preferable that the outer side surface 12*d* of the base portion 12 of the second core member 11*b* is arranged inside or flush with the outer surface of the second wall portion 85*b* of the second side peripheral wall portion 85. It is preferable that each of the outer side surface of the front-side outer leg portion 13 of the first core member 11*a* and the outer side surface of the front-side outer leg portion 13 of the second core member 11*b* is arranged inside or flush with the outer surface of the third wall portion 85*c* of the second side peripheral wall portion 85. It is preferable that each of the outer side surface of the rear-side outer leg portion 13 of the first core member 11*a* and the outer side surface of the rear-side outer leg portion 13 of the second core member 11*b* is arranged inside or flush with the outer surface of the fourth wall portion 85*d* of the second side peripheral wall portion 85.

Thus, in the case of this embodiment, the magnetic core 10 is inserted into the bobbin portion 30 via the cover member 80. Therefore, by maintaining the bobbin portion 30 and the cover member 80 in a good positional relationship, the magnetic core 10 and the coil 70 are also maintained in a good positional relationship, so that more stable characteristics of the coil component 100 can be realized.

In the case of this embodiment, the coil component 100 includes a first fixing tape 90 (see FIGS. 4 and 6) wound around the magnetic core 10. The first fixing tape 90 well maintains the state in which the core portion 15 of each of the first core member 11*a* and the second core member 11*b* is inserted in the through hole 36 of the bobbin portion 30.

More specifically, as shown in FIG. 4, the first fixing tape 90 is wound along the outer side surface 12*d* of the base portion 12 of the second core member 11*b*, the outer surface of the front-side outer leg portion 13 of the second core member 11*b*, the outer surface of the front-side outer leg portion 13 of the first core member 11*a*, the outer side surface 12*d* of the base portion 12 of the first core member 11*a*, the outer surface of the rear-side outer leg portion 13 of the first core member 11*a*, the outer surface of the rear-side outer leg portion 13 of the second core member 11*b*, and again the outer side surface 12*d* of the base portion 12 of the second core member 11*b*, for example.

In the case of this embodiment, the first fixing tape 90 is formed in a band-shape that is long in one direction. The first fixing tape 90 may be a self-adhesive tape on which a self-adhesive layer is formed in advance, or may be a band-shaped member adhered with an adhesive when the coil component 100 is assembled, for example.

Further, in the case of this embodiment, the coil component 100 includes a second fixing tape 95 (see FIGS. 4 and 6) wound around the magnetic core 10 and the cover member 80. The magnetic core 10 is well fixed to each of the bobbin portion 30 and the cover member 80 by the second fixing tape 95.

More specifically, as shown in FIGS. 4 and 6, the second fixing tape 95 is wound along the entire periphery of the outer surface of the first fixing tape 90, and the outer surface of the first wall portion 85*a* of the second side peripheral wall portion 85, the outer surface of the second wall portion 85*b* of the second side peripheral wall portion 85, the outer surface of the third wall portion 85*c* of the second side peripheral wall portion 85, and the outer surface of the fourth wall portion 85*d* of the second side peripheral wall portion 85, for example.

In the case of this embodiment, the second fixing tape 95 is formed in a band-shape that is long in one direction. For example, the second fixing tape 95 may be a self-adhesive tape on which a self-adhesive layer is formed in advance, or may be a band-shaped member adhered with an adhesive when the coil component 100 is assembled. As shown in FIG. 6, an upper portion of the second fixing tape 95 is wound around the first fixing tape 90.

The up-down dimension of the first fixing tape 90 is set to be substantially equal to the up-down dimension of the magnetic core 10, for example. The up-down dimension of the second fixing tape 95 is larger than the up-down dimension of the magnetic core 10 and smaller than the up-down dimension of the cover member 80, for example.

As shown in FIGS. 4 and 5, it is preferable that each external terminal 65 protrudes outside the outline of the coil component 100 excluding the external terminals 65 in plan view. Further, it is more preferable that the lengths by which the external terminals 65 of the first terminal portion 61 to the third terminal portion 63 protrude from the outline (dimensions W1, W2, W3, and W4 shown in FIG. 4) are substantially equal to each other, and the lengths by which the external terminals 65 of the fourth terminal portion 64 protrude from the outline (dimensions W5 and W6 shown in FIG. 4) are substantially equal to each other.

In the case of this embodiment, since at least one of the cover member 80 and the bobbin portion 30 elastically biases the other in the first direction, which is the extending direction of the tip portion of each external terminal 65, as described above, the relative displacement of the cover member 80 with respect to the bobbin portion 30 in the first direction is restricted. Therefore, it is possible to easily realize and maintain the state in which the external terminals 65 substantially equally protrude outside the outline.

Moreover, it is not necessary to consider the relative displacement of the cover member 80 with respect to the bobbin portion 30 in the first direction (left-right direction) when setting the left-right dimension of each external terminal 65, and it is possible to set the entire outer dimension of the coil component 100 including the external terminals 65 to be smaller.

In the case of this embodiment, as an example, each of the dimensions W1 to W4 is a length dimension from the right side surface of the second fixing tape 95 to the end surface of each external terminal 65 of the first terminal portion 61 to the third terminal portion 63 in the first direction, and each of the dimensions W4 and W5 is a length dimension from the left side surface of the second fixing tape 95 to the end surface of each external terminal 65 of the fourth terminal portion 64 in the first direction.

Each of the first core member 11*a* and the second core member 11*b* is integrally formed of a magnetic material in its entirety.

The main body member 20 (the bobbin portion 30 and the terminal holding portion 50) is integrally formed of an insulating material such as resin in its entirety, for example.

The cover member 80 is integrally formed of an insulating material such as resin in its entirety, for example.

As shown in FIG. 3, the bobbin portion 30 includes a first side surface 45 arranged along the first wall portion 82*a* and a second side surface 48 arranged along the second wall portion 82*b*, for example.

In addition, at least one of the first wall portion 82*a* and the first side surface 45 elastically biases the other in the first direction. Further, the second side surface 48 and the second wall portion 82*b* are formed flat and are in surface contact with each other.

In this manner, when the cover member 80 is externally fitted to the bobbin portion 30, by arranging the second side surface 48 and the second wall portion 82*b* to be in surface contact with each other, it is possible to easily position the cover member 80 with respect to the bobbin portion 30 without using a dedicated jig. Moreover, since the state in which the second side surface 48 and the second wall portion 82*b* are in surface contact with each other is maintained well, it is possible to restrict the relative displacement of the cover member 80 with respect to the bobbin portion 30 around each of the Z axis and the Y axis. Therefore, it is possible to more easily realize and maintain the state in which the above-mentioned dimensions W1 to W4 are equal to each other and the above-mentioned dimensions W5 and W6 are equal to each other.

Moreover, when setting the length dimension of each external terminal 65 in the first direction, by considering the length dimension from the second side surface 48 to the end surface of each external terminal 65 of the first terminal portion 61 to the third terminal portion 63 in the first direction and the length dimension from the second side surface 48 to the end surface of each external terminal 65 of the fourth terminal portion 64 in the first direction, the above-described arrangement can be easily realized. Therefore, it is possible to set the entire outer dimension of the coil component 100 including the external terminals 65 to be further smaller.

As shown in FIG. 3, in the case of this embodiment, the first side surface 45 is formed by the right side surface of the first collar portion 41. The second side surface 48 is formed by the left side surface of the second collar portion 42, for example.

Therefore, the first side surface 45 (a reference surface 49, which will be described later) is orthogonal to the first direction (in the case of this embodiment, the left-right direction). Also, the second side surface 48 is orthogonal to the first direction (in the case of this embodiment, the left-right direction). The first side surface 45 is arranged to face rightward, and the second side surface 48 is arranged to face leftward.

As shown in FIGS. 3 and 8, at least one of the cover member 80 and the bobbin portion 30 has a spring piece 83 that elastically biases the other, for example. In the case of this embodiment, the cover member 80 has the spring piece 83, and the cover member 80 elastically biases the bobbin portion 30 by means of the spring piece 83, as an example.

The spring piece 83 can elastically deform toward one side in the first direction. When the cover member 80 is being externally fitted to the bobbin portion 30, by pushing the cover member 80 downward against the bobbin portion 30, the cover member 80 is pressed by the bobbin portion 30, so that the spring piece 83 elastically deforms toward one side in the first direction and the spring piece 83 elastically biases the bobbin portion 30 toward the other side in the first direction (which may be hereinafter simply referred to as a biasing direction).

Thus, since the bobbin portion 30 is elastically biased by the spring piece 83 which can elastically deform by a sufficient amount of displacement, even if there is a manufacturing variation in the dimension of either one or both of the bobbin portion 30 and the cover member 80 in the first direction, the spring piece 83 elastically deforms in conformity with the manufacturing variation, so that the manufacturing variation can be better absorbed. Therefore, the cover member 80 can suitably bias the bobbin portion 30 regardless of the manufacturing variation.

In the case of this embodiment, as an example, a portion of the first wall portion 82*a* of the cover member 80 forms the spring piece 83, and the cover member 80 (the first wall portion 82*a*) elastically biases the bobbin portion 30 (the first side surface 45) by means of the spring piece 83. Further, as shown in FIG. 6, the first side surface 45 is arranged on the left side of the spring piece 83. Therefore, the biasing direction of the spring piece 83 is the leftward direction, which coincides with the direction in which the second side surface 48 faces. Thus, the second side surface 48 is biased leftward (toward the second wall portion 82*b*) by the spring piece 83 and is in good surface contact with the inner surface of the second wall portion 82*b*.

As shown in FIGS. 6 and 8, in the case of this embodiment, the spring piece 83 has a cantilever structure, as an example. More specifically, one end of the spring piece 83 is supported while the other end is not supported.

This makes it possible to realize a structure in which the spring piece 83 can elastically deform by a more and sufficient amount of displacement. Therefore, the cover member 80 can be smoothly externally fitted to the bobbin portion 30, and the cover member 80 can elastically bias the bobbin portion 30 well.

Note that the spring piece 83 is not limited to the cantilever structure, and may have a double-support structure in which one and the other ends of the spring piece 83 are both supported.

The spring piece 83 has a cantilever structure in which one end portion of the spring piece 83 in the direction in which the cover member 80 is externally fitted to the bobbin portion 30 is supported.

In this manner, for example, if the first side surface 45 has irregularities formed along the externally-fitting direction, the spring piece 83 can elastically deform in the first direction to conform to the irregularities when the cover member 80 is externally fitted to the bobbin portion 30. Therefore, the contact of the spring piece 83 with the bobbin portion 30 can be suppressed.

As shown in FIG. 8, the spring piece 83 is formed to extend downward from the upper edge of the through opening 88*a* formed in the first wall portion 82*a*. That is, the upper end portion (a base end portion 83*a*, which will be described later) of the spring piece 83 is supported by the first wall portion 82*a*. More specifically, the upper end portion of the spring piece 83 is a fixed end, and the lower end portion (a tip portion 83*c*, which will be described later) of the spring piece 83 is a free end.

Note that, for example, the spring piece 83 may also be formed to extend upward from the lower edge of the through opening 88*a* formed in the first wall portion 82*a*. That is, the upper end portion (the base end portion 83*a*, which will be described later) of the spring piece 83 may be a free end, and the lower end portion (the tip portion 83*c*, which will be described later) of the spring piece 83 may be a fixed end.

Note that the extending direction of the spring piece 83 is not limited to the externally-fitting direction, and may be the second direction, for example.

In addition, in the case of this embodiment, at least one part of the spring pieces 83 may be arranged along the first side surface 45. Thus, for example, the spring piece 83 may be formed by a portion of the top surface portion 81 and a portion of the first wall portion 82*a*.

As shown in FIGS. 1, 2, and 8, the spring piece 83 is formed at each of the front and rear portions of the first wall portion 82*a* such that the through hole 36 of the bobbin portion 30 is interposed therebetween in the front-rear direction, for example. In other words, the through hole 36 is arranged between the front-side spring piece 83 and the rear-side spring piece 83. Thus, the two spring pieces 83 are formed to be arranged side by side in the front-rear direction, that is, in a direction orthogonal to the first direction, and it is thus possible to realize a structure in which the spring pieces 83 better elastically biases the first side surface 45 in the first direction.

The spring pieces 83 extend in parallel to each other, for example.

Each spring piece 83 is a leaf spring formed in a substantially flat plate shape, for example.

The shape of each spring piece 83 as viewed in the first direction (left-right direction) is a substantially rectangular shape that is long in the up-down direction, for example. The thickness dimension of the spring piece 83 is substantially constant at any position in the up-down direction and is set to be equal to the thickness dimension of the first wall portion 82*a*.

As shown in FIG. 6, the spring piece 83 bends convexly toward one side (rightward) in the first direction and also bends convexly toward the other side (leftward) in the first direction.

More specifically, each spring piece 83 includes a base end portion 83*a* connected to the first wall portion 82*a*, a bending portion 83*b* connected to the base end portion 83*a*, and a tip portion 83*c* connected to the bending portion 83*b*, for example.

The base end portion 83*a* extends downward from the upper edge of the through opening 88*a*, and the bending portion 83*b* bends such that the amount of leftward displacement increases downward from the lower edge of the base end portion 83*a*. The tip portion 83*c* extends downward from the lower edge of the bending portion 83*b*.

Further specifically, the boundary between the outer surface of the base end portion 83*a* and the outer surface of the bending portion 83*b* protrudes outside the outer surface of the first wall portion 82*a*, for example. In addition, it is preferable that the boundary between the inner surface 831*b* of the bending portion 83*b* and the inner surface 831*c* of the tip portion 83*c* protrudes inside the inner surface of the first wall portion 82*a* or is located on the same plane as the inner surface of the first wall portion 82*a*, for example.

In the case of this embodiment, as described above, a gap is formed between the inner side surface 12*c* of the base portion 12 of the first core member 11*a* and the outer surface of the first wall portion 82*a* (see FIG. 4). This prevents the spring piece 83 and the base portion 12 from making contact with each other even though the spring piece 83 partially protrudes outside (to the right side of) the outer surface of the first wall portion 82*a*.

Each spring piece 83 is formed integrally with the cover member 80, for example. Therefore, the spring piece 83 is formed of the same type of resin material as the resin material forming the cover member 80.

However, the spring piece 83 may be incorporated into the cover member 80 by insert molding, for example. In this case, the spring piece 83 is formed of metal. The spring piece 83 may also be formed separately from the cover member 80, for example, fixed to the cover member 80 with an adhesive or the like. In this case, the spring piece 83 may be formed of the same type of resin material as the resin material forming the cover member 80, or may be formed of another material such as metal.

Further, in the case of this embodiment, in the coil component 100, one of the cover member 80 and the bobbin portion 30 (in the case of this embodiment, the cover member 80 as an example) has the spring piece 83, and the other of the cover member 80 and the bobbin portion 30 (in the case of this embodiment, the bobbin portion 30 as an example) has a bulging portion 46 bulging toward the spring piece 83.

In this manner, it is possible to better ensure that the spring piece 83 contacts the bobbin portion 30 (the bulging portion 46) when the cover member 80 is externally fitted to the bobbin portion 30. Therefore, it is possible to better ensure that the relative displacement of the bobbin portion 30 with respect to the cover member 80 in the first direction is restricted.

More specifically, the bulging portion 46 bulges in a direction opposite to the biasing direction of the spring piece 83 (the other side in the first direction), that is, toward the one side in the first direction, for example. The spring piece 83 is elastically deformed toward the one side in the first direction by being pressed toward the one side by the bulging portion 46.

More specifically, in the case of this embodiment, the bulging portion 46 is formed on the first side surface 45 of the bobbin portion 30, as an example. The spring piece 83 is arranged on the right side of the first side surface 45. Therefore, the direction in which the bulging portion 46 bulges is the rightward direction, which coincides with the direction in which the inner surface of the second wall portion 82*b* faces. Thus, the second side surface 48 is further biased leftward (toward the second wall portion 82*b*) by the bulging portion 46 and is in good surface contact with the inner surface of the second wall portion 82*b*.

The bulging portion 46 is formed on the first side surface 45 at a position corresponding to each of the pair of spring pieces 83. Therefore, the bulging portion 46 is formed at each of front and rear portions of the first side surface 45 such that the through hole 36 is interposed therebetween in the front-rear direction, as an example. In other words, the through hole 36 is arranged between the front-side bulging portion 46 and the rear-side bulging portion 46.

It is preferable that, in at least a portion of the bulging portion 46, the amount by which the bulging portion 46 bulges toward the other of the cover member 80 and the bobbin portion 30 increases in the direction in which the cover member 80 is externally fitted to the bobbin portion 30, for example.

As shown in FIG. 6, in the case of this embodiment, the amount by which the bulging portion 46 bulges toward the cover member 80 increases downward, as an example.

In this manner, the biasing force of the spring piece 83 on the bobbin portion 30 increases downward, so that it is possible to realize a structure in which the spring piece 83 well elastically biases the bobbin portion 30 when the cover member 80 is externally fitted to the bobbin portion 30.

Moreover, as described above, in the case of this embodiment, the spring piece 83 has a cantilever structure in which the upper end portion (the base end portion 83*a*) of the spring piece 83 in the direction in which the cover member 80 is externally fitted to the bobbin portion 30 is supported. Thus, when the cover member 80 is externally fitted to the bobbin portion 30, the spring piece 83 can well elastically deform along the shape of the bulging portion 46, of which the amount of bulge toward the cover member 80 increases in the externally-fitting direction (downward).

As shown in FIG. 6, each bulging portion 46 includes a tapered portion 46*a* in which the amount of bulge increases downward in a tapered manner and a flat portion 46*b* formed flat and arranged vertically.

Each of the tapered portion 46*a* and the flat portion 46*b* is arranged to face the inner surface of the first wall portion 82*a*.

The flat portion 46*b* is orthogonal to the first direction (in the case of this embodiment, the left-right direction), for example.

The upper edge of each tapered portion 46*a* is connected to the lower edge of a guiding portion 47, which will be described later, and the lower edge of each tapered portion 46*a* is connected to the upper edge of the corresponding flat portion 46*b*. The lower edge of each flat portion 46*b* is connected to the upper surface of the first terminal holding portion 52.

Further, on the first side surface 45, a pair of front and rear guiding portions 47 (see FIG. 9A) in which the amount of bulge decreases upward in a tapered manner is formed above the respective bulging portions 46. The front-side guiding portion 47 is formed continuously with the tapered portion 46*a* of the front-side bulging portion 46, and the rear-side guiding portion 47 is formed continuously with the tapered portion 46*a* of the rear-side bulging portion 46. Each guiding portion 47 is formed from the upper end of the first side surface 45 to the upper edge of the tapered portion 46*a*, for example.

As shown in FIGS. 3, 6 and 9B, the bulging portion 46 (the tapered portion 46*a* and the flat portion 46*b*) protrudes rightward (toward the first wall portion 82*a*) beyond the portion of the first side surface 45 other than the bulging portion 46 and the guiding portion 47 (hereinafter, a reference surface 49). More specifically, the outer side surface of the bulging portion 46 is arranged on the left side of the right side surface of the first terminal holding portion 52.

The guiding portion 47 is arranged on the left side of the reference surface 49.

The inclination angle of the guiding portion 47 with respect to the reference surface 49 and the inclination angle of the tapered portion 46*a* with respect to the reference surface 49 are set to be equal to each other, and the inclined surface of the guiding portion 47 and the inclined surface of the tapered portion 46*a* are arranged on the extension of each other. Therefore, the inclined surface of the guiding portion 47 and the inclined surface of the tapered portion 46*a* are arranged flush with each other (see FIGS. 6 and 9B).

Each of the guiding portion 47 and the tapered portion 46*a* is formed to extend in the up-down direction. The front-rear dimension of the guiding portion 47 and the front-rear dimension of the tapered portion 46*a* are set to be equal to each other. Therefore, the combined portion of the guiding portion 47 and the tapered portion 46*a* has a straight line-shape extending in the up-down direction in side view, for example.

In addition, a notch-shaped portion 45*a* that opens upward and in the left-right direction is formed at a portion of the upper end surface of the first collar portion 41 interposed between the front-side guiding portion 47 and the rear-side guiding portion 47 (see FIGS. 9A and 9C).

When the cover member 80 is externally fitted to the bobbin portion 30, the pair of spring pieces 83 is guided along the corresponding guiding portions 47 toward the bulging portions 46.

Here, as shown in FIG. 6, in the case of this embodiment, it is preferable that the tip portion 83*c* of the spring piece 83 has a contact portion 84 that contacts the other of the cover member 80 and the bobbin portion 30 (in the case of this embodiment, the bobbin portion 30 as an example) and biases the other (the bobbin portion 30), and a portion of the spring piece 83 closer to the base end than the contact portion 84 is separated from the other (the bobbin portion 30).

This can reduce the area of the contact portion 84 (the spring piece 83) in contact with the bobbin portion 30. Therefore, the spring piece 83 can be positioned appropriately (at an intended position) with respect to the bobbin portion 30 regardless of the size or the inclination angle of the portion of the bobbin portion 30 in contact with the contact portion 84.

The contact portion 84 may be in line contact, point contact, or surface contact with the other (the bobbin portion 30), for example. When the contact portion 84 is in surface contact with the bobbin portion 30, it is preferable that the height dimension (up-down dimension) of the contact portion 84 is smaller than its width dimension (front-rear dimension). When the height dimension of the contact portion 84 becomes further smaller than its width dimension, it becomes line contact. That is, that the contact portion 84 is in line contact with the bobbin portion 30 means that the height dimension of the contact portion 84 is significantly smaller than its width dimension.

Among these, in this embodiment, it is more preferable that the contact portion 84 is in line contact or point contact with the other (the bobbin portion 30), and a portion of the tip portion 83*c* of the spring piece 83 closer to the tip end than the contact portion 84 is separated from the other (the bobbin portion 30).

This can further reduce the area of the contact portion 84 (the spring piece 83) in contact with the bobbin portion 30. Therefore, the spring piece 83 can be positioned appropriately (at an intended position) with respect to the bobbin portion 30 regardless of the size or the inclination angle of the portion of the bobbin portion 30 in contact with the contact portion 84.

In the case of this embodiment, as shown in FIG. 6, the boundary between the inner surface 831*b* of the bending portion 83*b* and the inner surface 831*c* of the tip portion 83*c* is the contact portion 84 against the bobbin portion 30. The contact portion 84 is in line contact with the flat portion 46*b* of the bulging portion 46 along the front-rear direction, for example.

More specifically, the bending portion 83*b* is inclined rightward with respect to the flat portion 46*b* in the upward direction, for example. The tip portion 83*c* is inclined rightward with respect to the flat portion 46*b* in the downward direction, for example. Further specifically, the bending portion 83*b* is gradually separated away from the flat portion 46*b* in the upward direction with respect to the contact portion 84, and the tip portion 83*c* is gradually separated away from the flat portion 46*b* in the downward direction with respect to the contact portion 84.

Thus, since the coil component 100 has a structure in which the spring piece 83 is in line contact with the flat portion 46*b* orthogonal to the first direction, the cover member 80 can well bias the bobbin portion 30 toward the other side (left side) in the first direction.

FIG. 7 illustrates a state before the cover member 80 is externally fitted to the bobbin portion 30, that is, a state in which no external force is acting on the spring piece 83. In FIG. 7, the flat portion 46*b* of the bulging portion 46 is indicated by a long dashed double-short dashed line for convenience.

As shown in FIG. 7, before the cover member 80 is externally fitted to the bobbin portion 30, the outer and inner surfaces of the base end portion 83*a* are orthogonal to the first direction (left-right direction). The outer surface of the base end portion 83*a* is arranged flush with the outer surface of the portion of the first wall portion 82*a* other than the spring piece 83 (hereinafter, a main portion 821*a*), for example, and the inner surface of the base end portion 83*a* is arranged flush with the inner surface of the main portion 821*a*, for example.

Similarly, before the cover member 80 is externally fitted to the bobbin portion 30, the outer surface and the inner surface 831*c* of the tip portion 83*c* are orthogonal to the first direction (left-right direction). The outer surface of the tip portion 83*c* is arranged inside the outer surface of the main portion 821*a*, and the inner surface 831*c* of the tip portion 83*c* is arranged inside the inner surface of the main portion 821*a*.

Further, before the cover member 80 is externally fitted to the bobbin portion 30, the outer surface of the bending portion 83*b* is arranged inside the outer surface of the main portion 821*a*, and the inner surface 831*b* of the bending portion 83*b* is arranged inside the inner surface of the main portion 821*a*, for example.

Therefore, before the cover member 80 is inserted into the bobbin portion 30, a portion of the spring piece 83 (for example, the bending portion 83*b* and the tip portion 83*c*) bends in the biasing direction, that is, toward the other side in the first direction beyond the main portion 821*a*. More specifically, as shown in FIG. 7, a portion of the spring piece 83 (the inner surface 831*b* of the bending portion 83*b* and the inner surface 831*c* of the tip portion 83*c*) is located beyond the flat portion 46*b* in the biasing direction (leftward direction).

In this manner, even if there is a manufacturing variation in the dimension of the bobbin portion 30 in the first direction, the spring piece 83 stably contacts the flat portion 46*b*, so that the cover member 80 can well elastically biases the first side surface 45 (the bobbin portion 30).

In the case of this embodiment, when the cover member 80 is externally fitted to the bobbin portion 30, the spring piece 83 is pressed rightward by the bulging portion 46 and swings (elastically deforms) rightward, that is, in the direction opposite to the biasing direction with respect to a fulcrum at the boundary between the base end portion 83*a* and the first wall portion 82*a*.

Further, as shown in FIGS. 1 and 8, in the case of this embodiment, at least one of the third wall portion 82*c* and the fourth wall portion 82*d* is fitted to the bobbin portion 30 in a fitting structure.

In this manner, the relative displacement of the cover member 80 with respect to the bobbin portion 30 is restricted in the direction parallel to the mounting surface and orthogonal to the first direction, namely the second direction. More specifically, for example, it is possible to position the main body member 20 including the bobbin portion 30 at a desired position in the front-rear direction in the internal space of the cover member 80. Therefore, in the case of this embodiment, for example, it is possible to arrange the main body member 20 at the center in the front-rear direction and to well maintain this positional relationship.

Moreover, since the cover member 80 is fitted to the bobbin portion 30, it is possible to inhibit the bobbin portion 30 from falling out of the cover member 80 in the up-down direction.

In the case of this embodiment, both of the third wall portion 82*c* and the fourth wall portion 82*d* are fitted to the bobbin portion 30 in a fitting structure.

More specifically, as shown in FIGS. 2, 4, etc., the first terminal holding portion 52 has a first projecting portion 53*a* protruding from the front surface of the first terminal holding portion 52 toward one side (front side) in the second direction, and a first projecting portion 53*b* protruding from the rear surface of the first terminal holding portion 52 toward the other side (rear side) in the second direction. Similarly, the second terminal holding portion 55 has a second projecting portion 56*a* protruding from the front surface of the second terminal holding portion 55 toward one side (front side) in the second direction, and a second projecting portion 56*b* protruding from the rear surface of the second terminal holding portion 55 toward the other side (rear side) in the second direction.

Further, as shown in FIG. 2, for example, first slit portions 89*a* are formed at respective portions of the third wall portion 85*c* of the second side peripheral wall portion 85 corresponding to the first projecting portion 53*a* and the second projecting portion 56*a*. Each first slit portion 89*a* is formed to penetrate the third wall portion 85*c* in the second direction (front-rear direction), for example. However, instead of the first slit portion 89*a*, a first concave portion (not shown in the drawings) recessed frontward from the inner surface of the third wall portion 85*c* may be formed. Each first slit portion 89*a* extends in a substantially straight line in the left-right direction, for example.

Similarly, as shown in FIG. 2, for example, second slit portions 89*b* are formed at respective portions of the fourth wall portion 85*d* of the second side peripheral wall portion 85 corresponding to the first projecting portion 53*b* and the second projecting portion 56*b*. Each second slit portion 89*b* is formed to penetrate the fourth wall portion 85*d* in the second direction (front-rear direction), for example. However, instead of the second slit portion 89*b*, a second concave portion (not shown in the drawings) recessed rearward from the inner surface of the fourth wall portion 85*d* may be formed. Each second slit portion 89*b* extends in a substantially straight line in the left-right direction, for example.

Each of the first projecting portion 53*a* and the second projecting portion 56*a* is fitted to the corresponding first slit portion 89*a*. Similarly, each of the first projecting portion 53*b* and the second projecting portion 56*b* is fitted to the corresponding second slit portion 89*b*.

Thus, since both of the third wall portion 82*c* and the fourth wall portion 82*d* are fitted to the bobbin portion 30 in a fitting structure, it is possible to restrict the relative displacement of the cover member 80 with respect to the bobbin portion 30 around each of the X axis and the Y axis. In this manner, it is possible to better maintain the state in which the cover member 80 is externally fitted to the bobbin portion 30.

In the case of this embodiment, the length by which the first projecting portion 53*a* protrudes and the length by which the first projecting portion 53*b* protrudes are set to be equal to each other. Similarly, the length by which the second projecting portion 56*a* protrudes and the length by which the second projecting portion 56*b* protrudes are set to be equal to each other. In addition, the length by which the first projecting portions 53*a* and 53*b* protrude and the length by which the second projecting portions 56*a* and 56*b* protrude are set to be equal to each other.

Each of the first projecting portion 53*a* and the second projecting portion 56*a* and each first slit portion 89*a* may be further fixed to each other with an adhesive or the like, which is not shown in the drawings. Similarly, each of the first projecting portion 53*b* and the second projecting portion 56*b* and each second slit portion 89*b* may be further fixed to each other with an adhesive or the like, which is not shown in the drawings.

The coil component 100 according to this embodiment is constituted as described above. This coil component 100 can be used as a high withstand voltage pulse transformer, as an example. However, the use of the coil component 100 is not limited to this example.

The coil component 100 can be assembled as follows, for example.

First, each winding wire 71 of the coil 70 (the first coil and the second coil) is wound around the tubular portion 31 of the bobbin portion 30. Each end portion of each winding wire 71 is entwined around the entwining terminal 66 of the corresponding terminal portion 60 and is fixed by welding or soldering.

Next, the cover member 80 is put over the bobbin portion 30 from above. At this time, for example, the tip portion 83*c* of the spring piece 83 is first arranged along the corresponding guiding portion 47 of the first side surface 45, and the inner surface of the second wall portion 82*b* is arranged in surface contact with the second side surface 48. Then, the cover member 80 is pushed downward against the main body member 20 until each of the first projecting portion 53*a* and the second projecting portion 56*a* is fitted to the corresponding first slit portion 89*a* and each of the first projecting portion 53*b* and the second projecting portion 56*b* is fitted to the corresponding second slit portion 89*b*. At this time, the boundary between the bending portion 83*b* and the tip portion 83*c* of the spring piece 83 slides downward along the inclined surface of the guiding portion 47 and the inclined surface of the tapered portion 46*a* to reach the flat portion 46*b*. In this manner, the cover member 80 is externally fitted to the bobbin portion 30.

Next, the core portion 15 of the first core member 11*a* is inserted into the through hole 36 from the through opening 88*a*, while the core portion 15 of the second core member 11*b* is inserted into the through hole 36 from the through opening 88*b*.

Next, the first fixing tape 90 is wound around the magnetic core 10 at least once. In this manner, the magnetic core 10 can be fixed to the cover member 80 and the bobbin portion 30. Further, the second fixing tape 95 is wound around each of the first fixing tape 90 and the second side peripheral wall portion 85 of the cover member 80 at least once (see FIGS. 4 and 6). In this manner, the magnetic core 10 can be more securely fixed to the cover member 80 and the main body member 20.

The coil component 100 is thus obtained.

Although the embodiments have been described above with reference to the drawings, they are merely examples of the present invention, and various arrangements other than the above may be adopted.

For example, although an example in which the cover member 80 elastically biases the bobbin portion 30 has been described above, the present invention is not limited to this example, and the bobbin portion 30 may elastically bias the cover member 80. That is, the bobbin portion 30 may be elastically deformed, and the bobbin portion 30 may elastically bias the cover member 80 by means of its elastic restoring force.

In this case, for example, the bobbin portion 30 may have a spring piece 83 that elastically biases the cover member 80, and the cover member 80 may have a bulging portion 46 bulging toward the spring piece 83.

Further, in the present invention, the cover member 80 may elastically bias the bobbin portion 30 and the bobbin portion 30 may elastically bias the cover member 80. That is, the cover member 80 may be elastically deformed and the cover member 80 may elastically bias the bobbin portion 30 by means of its elastic restoring force, and the bobbin portion 30 may be elastically deformed and the bobbin portion 30 may elastically bias the cover member 80 by means of its elastic restoring force.

In this case, the direction in which the cover member 80 elastically biases the bobbin portion 30 and the direction in which the bobbin portion 30 elastically biases the cover member 80 may be directions that are parallel to the mounting surface and are different from each other (for example, orthogonal to each other). In other words, for example, the cover member 80 may elastically bias the bobbin portion 30 in the first direction, and the bobbin portion 30 may elastically bias the cover member 80 in the second direction. In addition, the cover member 80 may elastically bias the bobbin portion 30 toward the other side in the first direction and the bobbin portion 30 may elastically bias the cover member 80 toward the one side in the first direction, or vice versa.

In addition, although an example in which the cover member 80 elastically biases the bobbin portion 30 toward the other side in the first direction has been described above, the present invention is not limited to this example, and the cover member 80 may elastically bias the bobbin portion 30 toward both of the one side in the first direction and the other side in the first direction.

More specifically, for example, the cover member 80 may have spring pieces 83 that elastically bias the bobbin portion 30 on both of the one side in the first direction (the first wall portion 82*a*) and the other side in the first direction (the second wall portion 82*b*). In this case, it is preferable that bulging portions 46 bulging toward the cover member 80 are formed on both of the first side surface 45 and the second side surface 48 of the bobbin portion 30.

Even in this case, the bobbin portion 30 may elastically bias the cover member 80 as described above. That is, the bobbin portion 30 may elastically bias the cover member 80 toward both of the one side in the first direction and the other side in the first direction.

In addition, although an example in which the cover member 80 elastically biases the bobbin portion 30 by means of the spring piece 83 has been described above, the present invention is not limited to this example, and a tapered portion protruding toward the bobbin portion 30 in a tapered manner may be formed on the inner surface of the cover member 80, and the tapered portion may be elastically pressed against the bobbin portion 30, so that the cover member 80 may elastically bias the bobbin portion 30. In this case, as an example, it is preferable that the amount by which the upper portion of the tapered portion bulges toward the bobbin portion 30 gradually increases toward one side in the externally-fitting direction, and the amount by which the other portion (lower portion) of the tapered portion bulges toward the bobbin portion 30 gradually decreases toward the other side in the externally-fitting direction. In this manner, the cover member 80 can be smoothly externally fitted to the bobbin portion 30, and the tapered portion can well elastically bias the bobbin portion 30.

Even in this case, the bobbin portion 30 may elastically bias the cover member 80 as described above. That is, a tapered portion protruding toward the cover member 80 in a tapered manner may be formed on the outer surface of the bobbin portion 30.

In addition, although an example in which the magnetic core 10 includes two E cores has been described above, the present invention is not limited to this example, and the magnetic core 10 may include an E core and an I core.

Further, the magnetic core 10 may include two T cores, or may include a T core and an I core. In this case, the entire shape of the magnetic core 10 is H-shaped in plan view.

In addition, although an example in which the magnetic core 10 includes the core portion 15 has been described above, the magnetic core 10 may not include the core portion 15. That is, the magnetic core 10 may include two U-shaped core members, or may include a U-shaped core member and an I-shaped core member. In this case, the entire shape of the magnetic core 10 is a rectangular annular shape in plan view.

In addition, although an example in which the magnetic core 10 includes two members (the first core member 11*a* and the second core member 11*b*) has been described above, the magnetic core 10 may be one piece in its entirety, or may include three or more members.

This embodiment encompasses the following technical ideas.

(1) A coil component comprising:
a bobbin portion;
a magnetic core inserted through the bobbin portion;
a coil wound around the bobbin portion; and
a cover member covering the bobbin portion by being externally fitted to the bobbin portion, wherein the cover member and the bobbin portion abut each other, and at least one of the cover member and the bobbin portion elastically biases the other in a first direction parallel to a mounting surface.

(2) The coil component according to (1), wherein at least one of the cover member and the bobbin portion comprises a spring piece that elastically biases the other.

(3) The coil component according to (2), wherein the spring piece has a cantilever structure.

(4) The coil component according to (3), wherein the spring piece has a cantilever structure in which one end portion of the spring piece in a direction in which the cover member is externally fitted to the bobbin portion is supported.

(5) The coil component according to (3) or (4), wherein
a tip portion of the spring piece comprises a contact portion that contacts and biases the other of the cover member and the bobbin portion, and a portion of the spring piece closer to a base end than the contact portion is separated from the other.

(6) The coil component according to (5), wherein the contact portion is in line contact or point contact with the other, and a portion of the tip portion of the spring piece that is closer to a tip end than the contact portion is separated from the other.

(7) The coil component according to any one of (2) to (6), wherein one of the cover member and the bobbin portion comprises the spring piece, and the other of the cover member and the bobbin portion comprises a bulging portion bulging toward the spring piece.

(8) The coil component according to (7), wherein in at least a portion of the bulging portion, an amount by which the bulging portion bulges toward the other of the cover member and the bobbin portion increases in a direction in which the cover member is externally fitted to the bobbin portion.

(9) The coil component according to any one of (1) to (8), wherein the cover member comprises a side peripheral wall portion including a first wall portion and a second wall portion facing each other, the bobbin portion comprises a first side surface arranged along the first wall portion, at least one of the first wall portion and the first side surface elastically biases the other in the first direction, the bobbin portion comprises a second side surface arranged along the second wall portion, and the second side surface and the second wall portion are formed flat and are in surface contact with each other.

(10) The coil component according to any one of (1) to (9), wherein the cover member comprises a side peripheral wall portion having a rectangular tubular shape and including a first wall portion, a second wall portion, a third wall portion, and a fourth wall portion, the first wall portion and the second wall portion face each other, and the third wall portion and the fourth wall portion face each other, a direction in which the first wall portion and the second wall portion face each other is the first direction, a direction in which the third wall portion and the fourth wall portion face each other is a second direction orthogonal to the first direction, and at least one of the third wall portion and the fourth wall portion is fitted to the bobbin portion in a fitting structure.

What is claimed is:

1. A coil component comprising:

a bobbin portion;

a magnetic core inserted through the bobbin portion;

a coil wound around the bobbin portion; and a cover member covering the bobbin portion by being externally fitted to the bobbin portion, wherein the cover member and the bobbin portion abut each other, and at least one of the cover member and the bobbin portion elastically biases the other of the cover member and the bobbin portion in a first direction parallel to an axial direction of the coil, at least one of the cover member and the bobbin portion includes a spring piece that elastically biases the other of the cover member and the bobbin portion, the spring piece has a cantilever structure, a tip portion of the spring piece includes a contact portion that contacts and biases the other of the cover member and the bobbin portion, and a portion of the spring piece closer to a base end than the contact portion is separated from the other of the cover member and the bobbin portion.

2. The coil component according to claim 1, wherein the spring piece has the cantilever structure in which one end portion of the spring piece in a direction in which the cover member is externally fitted to the bobbin portion is supported.

3. The coil component according to claim 1, wherein the contact portion is in line contact or point contact with the other of the cover member and the bobbin portion, and a portion of the tip portion of the spring piece that is closer to a tip end than the contact portion is separated from the other of the cover member and the bobbin portion.

4. A coil component comprising:

a bobbin portion;

a magnetic core inserted through the bobbin portion;

a coil wound around the bobbin portion; and a cover member covering the bobbin portion by being externally fitted to the bobbin portion, wherein the cover member and the bobbin portion abut each other, and at least one of the cover member and the bobbin portion elastically biases of the other of the cover member and the bobbin portion in a first direction parallel to an axial direction of the coil, at least one of the cover member and the bobbin portion includes a spring piece that elastically biases the other of the cover member and the bobbin portion, and the other of the cover member and the bobbin portion includes a bulging portion bulging toward the spring piece.

5. The coil component according to claim 4, wherein in at least a portion of the bulging portion, an amount by which the bulging portion bulges toward the other of the cover member and the bobbin portion increases in a direction in which the cover member is externally fitted to the bobbin portion.

6. A coil component comprising:

a bobbin portion;

a magnetic core inserted through the bobbin portion;

a coil wound around the bobbin portion; and a cover member covering the bobbin portion by being externally fitted to the bobbin portion, wherein the cover member and the bobbin portion abut each other, and at least one of the cover member and the bobbin portion elastically biases of the other of the cover member and the bobbin portion in a first direction parallel to an axial direction of the coil, the cover member includes a side peripheral wall portion including a first wall portion and a second wall portion facing each other, the bobbin portion includes a first side surface arranged along the first wall portion, at least one of the first wall portion and the first side surface elastically biases the other in the first direction, the bobbin portion includes a second side surface arranged along the second wall portion, and the second side surface and the second wall portion are formed flat and are in surface contact with each other.

7. The coil component according to claim 1, wherein the cover member includes a side peripheral wall portion having a rectangular tubular shape and including a first wall portion, a second wall portion, a third wall portion, and a fourth wall portion, the first wall portion and the second wall portion face each other, and the third wall portion and the fourth wall portion face each other, a direction in which the first wall portion and the second wall portion face each other is the first direction, a direction in which the third wall portion and the fourth wall portion face each other is a second direction orthogonal to the first direction, and at least one of the third wall portion and the fourth wall portion is fitted to the bobbin portion in a fitting structure.

* * * * *